(12) United States Patent
Oikawa et al.

(10) Patent No.: US 9,039,309 B2
(45) Date of Patent: May 26, 2015

(54) EXCHANGEABLE LENS AND CAMERA BODY

(75) Inventors: Masafumi Oikawa, Mitaka (JP);
Kazuharu Imafuji, Kawasaki (JP);
Shigeo Takahashi, Yokohama (JP);
Shunji Nagaya, Kamakura (JP)

(73) Assignee: NIKON CORPORATION, Tokyo (JP)

( * ) Notice: Subject to any disclaimer, the term of this patent is extended or adjusted under 35 U.S.C. 154(b) by 0 days.

(21) Appl. No.: 13/468,612

(22) Filed: May 10, 2012

(65) Prior Publication Data

US 2012/0294598 A1    Nov. 22, 2012

Related U.S. Application Data

(60) Provisional application No. 61/564,592, filed on Nov. 29, 2011.

(30) Foreign Application Priority Data

May 13, 2011    (JP) .................................. 2011-108214

(51) Int. Cl.
  *G03B 17/14*    (2006.01)
  *G03B 17/18*    (2006.01)
  *H04N 5/232*    (2006.01)

(52) U.S. Cl.
  CPC ............ *H04N 5/23209* (2013.01); *G03B 17/14* (2013.01); *G03B 17/18* (2013.01); *G03B 2206/00* (2013.01)

(58) Field of Classification Search
  CPC .... G03B 17/14; G03B 17/18; G03B 2206/00; H04N 5/23209
  USPC .................. 396/125, 529–530, 532; 348/345
  See application file for complete search history.

(56) References Cited

U.S. PATENT DOCUMENTS

| | | | |
|---|---|---|---|
| 6,608,651 B2 * | 8/2003 | Mabuchi et al. | ............. 348/345 |
| 6,829,010 B1 | 12/2004 | Suzuki | |

(Continued)

FOREIGN PATENT DOCUMENTS

| | | |
|---|---|---|
| EP | 2 244 454 A1 | 10/2010 |
| JP | A-2-148206 | 6/1990 |

(Continued)

OTHER PUBLICATIONS

Extended European Search Report issued in European Application No. 12167787.6 dated Sep. 28, 2012.

(Continued)

*Primary Examiner* — Christ Mahoney
(74) *Attorney, Agent, or Firm* — Oliff PLC

(57) ABSTRACT

An exchangeable lens includes: a mount unit at which a camera body is detachably engaged; a plurality of drive target members, conditions of which change as a drive force is applied thereto; an initialization unit that executes initialization processing for each of the plurality of drive target members; an initialization status transmission unit that transmits initialization statuses, each indicating a status of the initialization processing executed for one of the drive target members, to the camera body via a first transmission path over predetermined first cycles; and a drive condition transmission unit that transmits a drive condition of at least one drive target member among the plurality of drive target members to the camera body via a second transmission path different from the first transmission path over predetermined second cycles different from the predetermined first cycles.

20 Claims, 10 Drawing Sheets

(56) References Cited

U.S. PATENT DOCUMENTS

| | | | |
|---|---|---|---|
| 2001/0009443 | A1 | 7/2001 | Suemoto et al. |
| 2002/0118963 | A1 | 8/2002 | Uenaka et al. |
| 2007/0058971 | A1 | 3/2007 | Tsuda |
| 2009/0284612 | A1 | 11/2009 | Abe et al. |
| 2011/0317990 | A1* | 12/2011 | Imafuji ............ 396/529 |
| 2012/0212635 | A1 | 8/2012 | Abe et al. |

FOREIGN PATENT DOCUMENTS

| | | |
|---|---|---|
| JP | A-H11-288030 | 10/1999 |
| JP | A-2005-164966 | 6/2005 |
| JP | A-2006-319631 | 11/2006 |
| JP | A-2008-058418 | 3/2008 |
| JP | A-2008-096907 | 4/2008 |
| JP | A-2008-216439 | 9/2008 |
| JP | A-2009-053429 | 3/2009 |
| JP | A-2010-015137 | 1/2010 |
| JP | A-2010-016585 | 1/2010 |
| JP | A-2010-206553 | 9/2010 |
| JP | A-2010-237514 | 10/2010 |

OTHER PUBLICATIONS

Apr. 30, 2014 Office Action issued in Japanese Patent Application No. 2013-181400 (with translation).

Sep. 9, 2014 Office Action issued in Japanese Patent Application No. 2013-181400 (with English translation).

* cited by examiner

EXCHANGEABLE LENS AND CAMERA BODY

This non-provisional application claims the benefit of U.S. Provisional Application No. 61/564,592 filed Nov. 29, 2011. This application also claims priority from Japanese Application No. 2011-108214 filed May 13, 2011. The disclosure of each of the earlier applications is incorporated herein by reference in its entirety.

BACKGROUND OF THE INVENTION

1. Field of the Invention

The present invention relates to an exchangeable lens and a camera body.

2. Description of Related Art

There are camera systems known in the related art comprise a camera body and an exchangeable lens that can be detachably mounted at the camera body. Japanese Laid Open Patent Publication No. 2006-319631 discloses a camera system comprising a camera head at which a motor, used to drive various lenses, an aperture and the like are disposed, and a camera body. At a camera head start up, initialization processing is first executed in order to initialize the communication components and then main startup processing is executed to start the motor unit and an image capturing unit in this camera system.

SUMMARY OF THE INVENTION

There is an issue that needs to be addressed more effectively in the camera system disclosed in the publication cited above, in that a time lag occurs at the camera body while the plurality of units are all started up at the camera head, which delays the process of camera head initialization.

An exchangeable lens according to a 1st aspect of the present invention, comprises: a mount unit at which a camera body is detachably engaged; a plurality of drive target members, conditions of which change as a drive force is applied thereto; an initialization unit that executes initialization processing for each of the plurality of drive target members; an initialization status transmission unit that transmits initialization statuses, each indicating a status of the initialization processing executed for one of the drive target members, to the camera body via a first transmission path over predetermined first cycles; and a drive condition transmission unit that transmits a drive condition of at least one drive target member among the plurality of drive target members to the camera body via a second transmission path different from the first transmission path over predetermined second cycles different from the predetermined first cycles.

An exchangeable lens according to a 2nd aspect of the present invention comprises: a mount unit at which a camera body is detachably engaged; a plurality of drive target members, conditions of which change as a drive force is applied thereto; an initialization unit that executes initialization processing for each of the plurality of drive target members; an initialization status transmission unit that transmits initialization statuses, each indicating a status of the initialization processing executed for one of the drive target members, to the camera body via a first transmission path over predetermined first cycles; and a drive condition transmission unit that transmits position information related to a position of at least one drive target member among the plurality of drive target members to the camera body via a second transmission path different from the first transmission path over predetermined second cycles different from the predetermined first cycles.

An exchangeable lens according to a 3rd aspect of the present invention comprises: a mount unit at which a camera body is detachably engaged; a drive target member, a condition of which changes as a drive force is applied thereto; an initialization unit that executes initialization processing for the drive target member; an initialization status transmission unit that transmits an initialization status indicating a status of the initialization processing executed for the drive target member to the camera body via a first transmission path over predetermined first transmission cycles; and a drive condition transmission unit that transmits position information related to a position of the drive target member, to the camera body via a second transmission path different from the first transmission path over predetermined second cycles different from the predetermined first cycles.

According to a 4th aspect of the present invention, in the exchangeable lens according to the 1st or 2nd aspect, it is preferable that after a change occurs in the initialization status of at least one drive target member among the plurality of drive target members, the drive condition transmission unit starts transmitting the drive condition of the drive target member, the initialization status of which has changed.

According to a 5th aspect of the present invention, in the exchangeable lens according to the 4th aspect, it is preferable that after the initialization statuses of all the drive target members for which initialization processing is executed by the initialization unit change, the drive condition transmission unit starts transmitting at least the drive condition of the one drive target member.

According to a 6th aspect of the present invention, in the exchangeable lens according to the 4th or 5th aspect, the initialization unit may start executing initialization processing for all the drive target members at once.

According to a 7th aspect of the present invention, in the exchangeable lens according to any one of the 4th through 6th aspects, it is preferable that one of the drive target members is an aperture; and the initialization unit completes initialization processing for the aperture ahead of the initialization processing for another drive target member.

According to a 8th aspect of the present invention, in the exchangeable lens according to the 7th aspect, it is preferable that until the initialization unit completes initialization processing for the aperture, the initialization status transmission unit transmits the initialization status information indicating that the initialization processing for a drive target member other than the aperture is not complete.

According to a 9th aspect of the present invention, in the exchangeable lens according to the 4th or 5th aspect, the initialization unit may initialize the drive target members in a predetermined order by executing the initialization processing for one drive target member at a time.

A camera body according to a 10th aspect of the present invention comprises: a mount unit at which an exchangeable lens is detachably mounted, with the exchangeable lens being equipped with a plurality of drive target members, drive conditions of which change as a drive force is applied thereto; an initialization status reception unit that receives initialization statuses, each indicating a status of specific initialization processing executed at the exchangeable lens for one of the drive target members, from the exchangeable lens via a first transmission path over first cycles; and a drive condition reception unit that receives a drive condition of at least one drive target member among the plurality of drive target members from the exchangeable lens via a second transmission path different from the first transmission path over second cycles different from the first cycles.

According to a 11th aspect of the present invention, in the camera body according to the 10th aspect, it is preferable that after detecting a change in at least the initialization status of the one drive target member, the drive condition reception unit starts receiving the drive condition of the drive target member the initialization status of which has changed.

According to a 12th aspect of the present invention, in the camera body according to the 10th or 11th aspect, it is preferable that after the initialization statuses of all the drive target members for which the initialization processing is executed at the exchangeable lens change, the drive condition reception unit starts receiving at least the drive condition of the one drive target member.

According to a 13th aspect of the present invention, the camera body according to any one of the 10th through 12th aspect may further comprise: a control unit that enables specific control processing to be executed for each of the plurality of drive target members, wherein: the control unit does not allow the control processing to be executed for any drive target member, execution of the initialization processing for which is indicated to be incomplete in the initialization status data.

According to a 14th aspect of the present invention, in the camera body according to the 13th aspect, it is preferable that one of the drive target members is an aperture; and the control unit enables aperture control processing to be executed for the aperture as the control processing.

An exchangeable lens according to a 15th aspect of the present invention comprises: a mount unit at which a camera body is detachably engaged; a drive target member, a condition of which changes as a drive force is applied thereto; an initialization unit that executes initialization processing for the drive target member; and a transmission unit that transmits an initialization status indicating a status of the initialization processing to the camera body in response to a request output from the camera body over first cycles.

According to a 16th aspect of the present invention, the exchangeable lens according to the 15th aspect may further comprise: a drive condition transmission unit that transmits a drive condition of the drive target member to the camera body via a second transmission path different from the first transmission path in response to a request output from the camera body over second cycles different from the first cycles, wherein: the drive condition transmission unit starts transmitting the drive condition of the drive target member after initialization of the drive target member is completed.

According to a 17th aspect of the present invention, in the exchangeable lens according to the 15th or 16th aspect, it is preferable that the exchangeable lens includes a plurality of drive target members; and the initialization unit starts executing the initialization processing for the plurality of drive target members at once.

According to a 18th aspect of the present invention, in the exchangeable lens according to the 17th aspect, it is preferable that after initialization of all the drive target members for which the initialization processing is executed by the initialization unit is completed, the drive condition transmission unit starts transmitting the drive condition of at least one drive target member among the plurality of drive target members.

An exchangeable lens according to a 19th aspect of the present invention comprises: a mount unit at which a camera body is detachably engaged; a plurality of drive target members, conditions of which change as a drive force is applied thereto; an initialization unit that executes initialization processing for each of the plurality of drive target members; an initialization status transmission unit that transmits initialization statuses, each indicating a status of the initialization processing executed for one of the drive target members, to the camera body via a first transmission path in response to a request output from the camera body over first cycles; and a drive condition transmission unit that transmits a drive condition of at least one drive target member among the plurality of drive target members to the camera body via a second transmission path different from the first transmission path in response to a request output from the camera body over second cycles different from the first cycles, wherein: after a change occurs at least in the initialization status of the one drive target member, the drive condition transmission unit starts transmitting the drive condition of the drive target member, the initialization status of which has changed.

BRIEF DESCRIPTION OF THE DRAWINGS

FIG. 7 is a timing chart indicating a procedure through which initialization is executed following a power on.

FIG. 10 is a timing chart indicating a procedure through which initialization is executed following a power on.

DESCRIPTION OF PREFERRED EMBODIMENTS

First Embodiment

Figure 1:
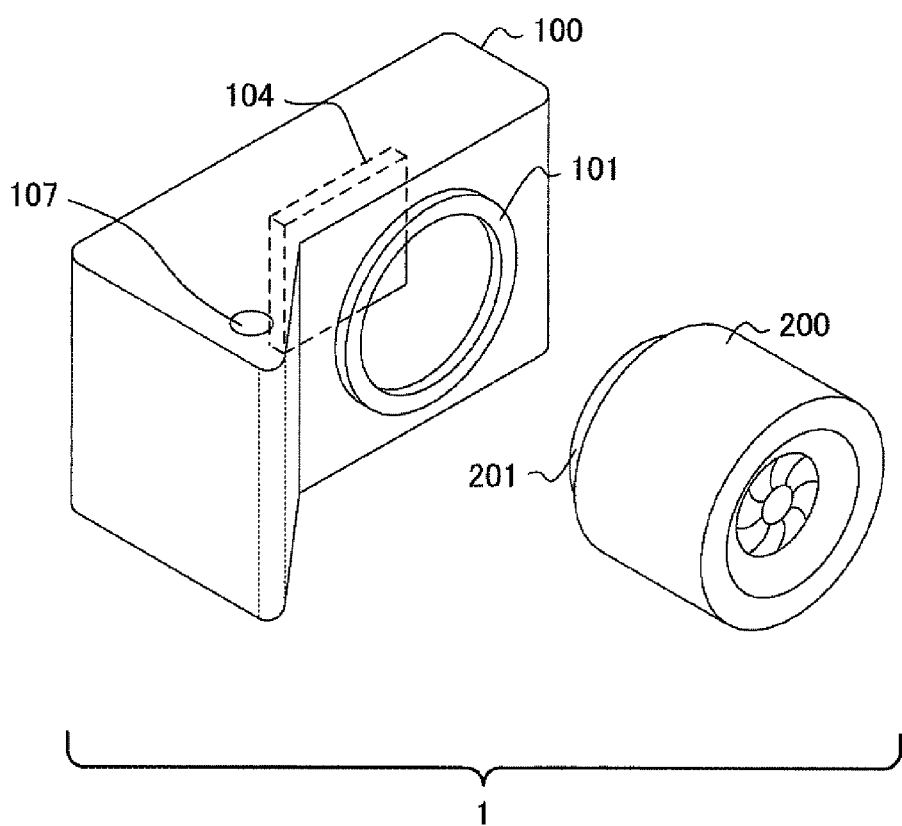
FIG. 1 is a perspective of a camera system compatible with exchangeable lenses, in which the present invention is adopted.

FIG. 1 is a perspective of a camera system compatible with exchangeable lenses, in which the present invention is adopted. It is to be noted that FIG. 1 only shows the units and devices relevant to the present invention and that an illustration and an explanation of other units and devices are not provided. A camera 1 comprises a camera body 100 and an exchangeable lens (also referred to as an interchangeable lens or a photographic lens) 200 that can be detachably mounted at the camera body 100.

The camera body 100 includes a lens mount 101 at which the exchangeable lens 200 is detachably mounted. A holding portion (electrical connector portion) 102, a part which projects out toward the inner circumferential side of the lens mount 101, with contact points held thereat, is disposed at the camera body 100 in an area near the lens mount 101 (on the inner circumferential side of the lens mount 101). A plurality of contact points are present at the holding portion 102 (see FIG. 3).

In addition, a lens mount 201, corresponding to the body-side lens mount 101, at which the camera body 100 is detachably engaged, is disposed at the exchangeable lens 200. A holding portion (electrical connector portion) 202, a part which projects out toward the inner circumferential side of the lens mount 201 with contact points held thereat, is disposed at the exchangeable lens 200 in an area near the lens mount 201 (on the inner circumferential side of the lens mount 201). A plurality of contact points are present at the holding portion 202 (see FIG. 3).

As the exchangeable lens 200 is engaged with the camera body 100, the holding portion 102 with a plurality of contact points held thereat becomes electrically and physically connected with the holding portion 202 holding a plurality of contact points. Via the two holding portions 102 and 202, power is provided from the camera body 1000 to the exchangeable lens 200 and signals are exchanged between the camera body 100 and the exchangeable lens 200.

An image sensor 104, which may be, for instance, a CMOS image sensor or a CCD image sensor, is disposed inside the camera body 100 at a position rearward relative to the lens mount 101. A button 107, functioning as an input device is disposed on the top side of the camera body 100. The user is able to issue a photographing instruction, a photographing condition setting instruction or the like to the camera body 100 by operating an input device such as the button 107.

Figure 2:
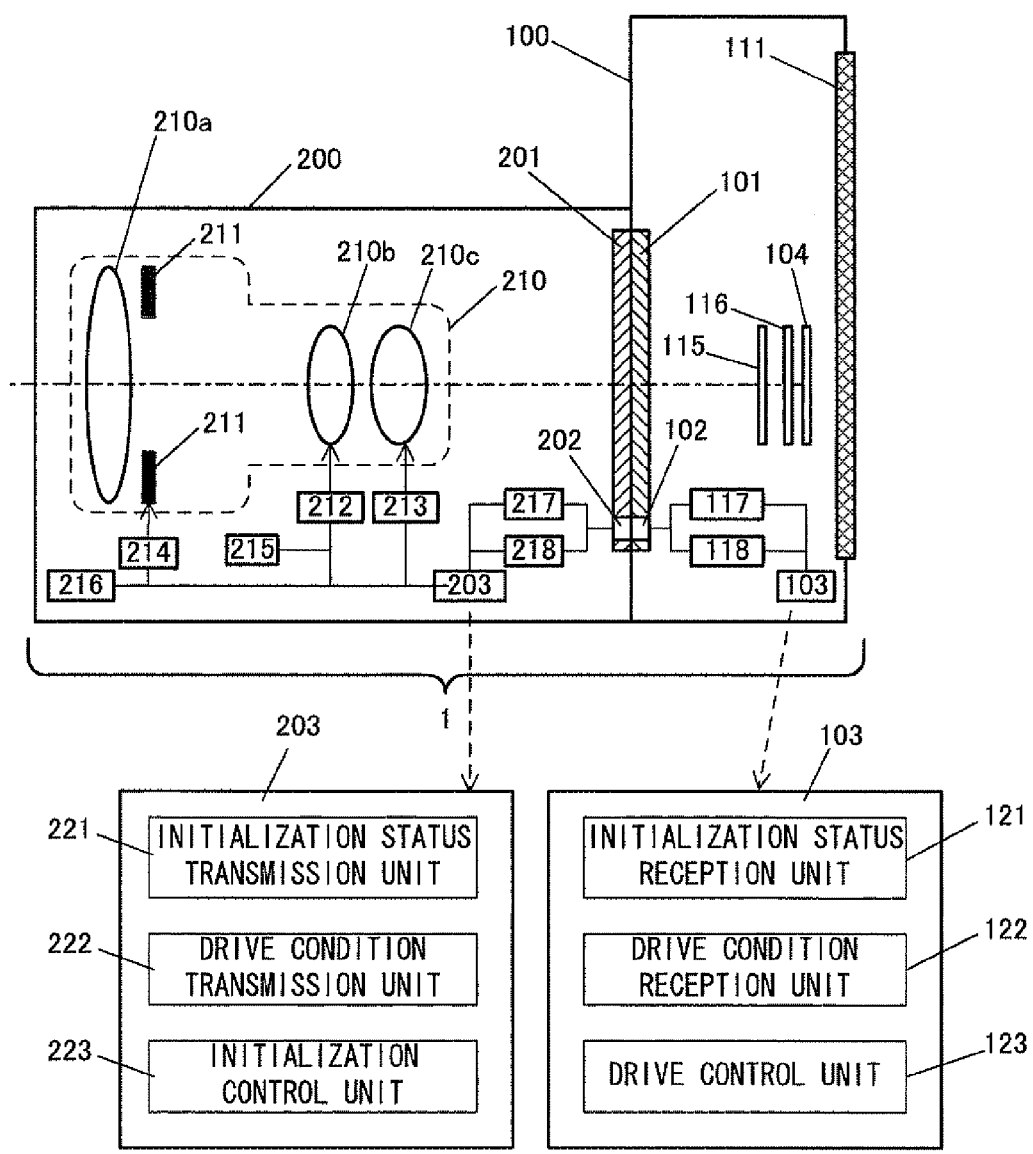
FIG. 2 is a sectional view of the camera system compatible with exchangeable lenses, in which the present invention is adopted.

FIG. 2 is a sectional view of the camera system compatible with exchangeable lenses, in which the present invention is adopted. The exchangeable lens 200 includes an image forming optical system 210 via which a subject image is formed. The image forming optical system 210 is constituted with a plurality of lenses 210a through 210c and an aperture 211. The plurality of lenses 210a through 210c includes a focusing lens 210 used to control the focus position for the subject image and a blur correction lens 210c via which an image blur occurring in the subject image is corrected.

A lens control unit 203, which controls the various components constituting the exchangeable lens 200, is disposed inside the exchangeable lens 200. The lens control unit 203 comprises a microcomputer, its peripheral circuits and the like (none shown). A first lens-side communication unit 217, a second lens-side communication unit 218, a focusing lens drive unit 212, a blur correction lens drive unit 213, an aperture drive unit 214, a ROM 215 and a RAM 216 are connected to the lens control unit 203.

The first lens-side communication unit 217 and the second lens-side communication unit 218 exchange data with the camera body 100 via communication contact points at the holding portions 102 and 202. The first lens-side communication unit 217 and the second lens-side communication unit 218 each function as a communication interface for the exchangeable lens 200. The lens control unit 203 engages in various types of communication (hotline communication and command data communication) with the camera body 100 (with a body control unit 103 to be described in detail later) via these communication interfaces.

The focusing lens drive unit 212, which includes an actuator such as a stepping motor, drives the focusing lens 210b in response to a signal input to the focusing lens drive unit 212. Likewise, the blur correction lens drive unit 213 and the aperture drive unit 214, each equipped with an actuator such as a voice coil motor, respectively drive the blur correction lens 210c and the aperture 211 in response to signals input thereto.

The focusing lens 210b is driven along the optical axis by the focusing lens drive unit 212. The blur correction lens 210c is driven by the blur correction lens drive unit 213 along a direction (X direction, Y direction) perpendicular to the optical axis. The aperture 211 is driven by the aperture drive unit 214 so as to alter the size (opening diameter) of the opening through which subject light is allowed to pass. Namely, these members are drive target members, the drive conditions of which change as they are driven with drive forces imparted from the corresponding drive units. The term "drive condition" used in this context refers to a condition, among the conditions inherent to each drive target member, which changes as the particular drive target member is driven. For instance, a drive condition of the focusing lens 210b may be its position assumed along the optical axis, a drive condition of the blur correction lens 210c may be its position assumed on a plane perpendicular to the optical axis, and a drive condition of the aperture 211 may be its opening diameter (and the F number of the image forming optical system 210, which changes in correspondence to the opening diameter).

It is to be noted that a drive target member other than the drive target members listed above (the focusing lens 210b, the blur correction lens 210c, and the aperture 211) may be disposed in the exchangeable lens 200. For instance, a zoom lens, which is allowed to move along the optical axis of the image forming optical system 210, as is the focusing lens 210b, may be included in the exchangeable lens 200, together with a mechanism (known as a power zoom mechanism) that electrically drives the zoom lens, also disposed in the exchangeable lens 200.

The ROM 215 is a nonvolatile storage medium into which a specific control program, to be executed by the lens control unit 203, and the like are stored in advance. The RAM 216 is a volatile storage medium used by the lens control unit 203 as a storage area where various types of data are stored.

The lens control unit 203 includes an initialization status transmission unit 221, a drive condition transmission unit 222 and an initialization control unit 223 embodied in software. These functional units are achieved in software as the lens control unit 203 executes the specific control program stored in the ROM 215.

The initialization control unit 223 executes a specific type of initialization processing for each of the plurality of drive target members listed above. The initialization status transmission unit 221 transmits, through a first transmission path (to be described in detail later), initialization status data (e.g., status data indicating whether the execution of the initialization processing has been completed or the initialization processing execution is not yet completed), indicating an initialization processing status for each of the plurality of drive target members, to the camera body 100 over predetermined cycles. The drive condition transmission unit 222 transmits, through a second transmission path (to be described in detail later) different from the first transmission path, drive condition data indicating the drive conditions of the drive target members described above to the camera body over predetermined cycles. The procedure through which the initialization status transmission unit 221 transmits the initialization status data to the camera body 100 over the predetermined cycles is now described. The camera body 100 keeps outputting a command requesting initialization status data to the exchangeable lens 200 over predetermined cycles until it receives a signal indicating completion of the initialization processing from the exchangeable lens 200. In response to this request command, the initialization status transmission unit 221 in the exchangeable lens 200 returns prepared initialization status data. Through this sequence, the initialization status transmission unit 221 transmits the initialization status data to the camera body 100 over the predetermined cycles.

A shutter 115, via which the exposure conditions at the image sensor 104 are controlled, and an optical filter 116, which is an integrated filter achieved by combining an optical low pass filter and an infrared cut-off filter, are disposed in front of the image sensor 104. The subject light having been transmitted through the image forming optical system 210 enters the image sensor 104 via the shutter 115 and the filter 116.

The body control unit 103, engaged in control of the various components of the camera body 100, is disposed inside the camera body 100. The body control unit 103 is constituted with a microcomputer, a RAM, peripheral circuits and the like (none shown).

A first body-side communication unit 117 and a second body-side communication unit 118 are connected to the body control unit 103. The first body-side communication unit 117 is connected to the holding portion 102 and is able to exchange data with the first lens-side communication unit 217 via a contact point held at the holding portion 102. The second body-side communication unit 118 is likewise able to exchange data with the second lens-side communication unit 218. Namely, the first body-side communication unit 117 and the second body-side communication unit 118 each function as a body-side communication interface. The body control unit 103 engages in various types of communication (hotline communication and command data communication) with the exchangeable lens 200 (with the lens control unit 203) via these communication interfaces.

A display device 111 constituted with an LCD panel or the like is disposed at the rear surface of the camera body 100. The body control unit 103 brings up on display at the display device 111 a subject image (referred to as a live view image) based upon an output from the image sensor 104 or various types of menu screens enabling selection of photographing conditions and the like.

The body control unit 103 includes an initialization status reception unit 121, a drive condition reception unit 122 and a drive control unit 123 embodied in software. These functional units are each achieved in software as the body control unit 103 executes a specific control program. The initialization status reception unit 121 receives the initialization status data transmitted by the initialization status transmission unit 221. The drive condition reception unit 122 receives the drive condition data indicating the drive conditions at the drive target members, which are transmitted by the drive condition transmission unit 222. Based upon the initialization status data received via the initialization status reception unit 121, the drive control unit 123 executes control processing (to be described later) for each of the drive target members.

(Description of the Holding Portions 102 and 202)

Figure 3:
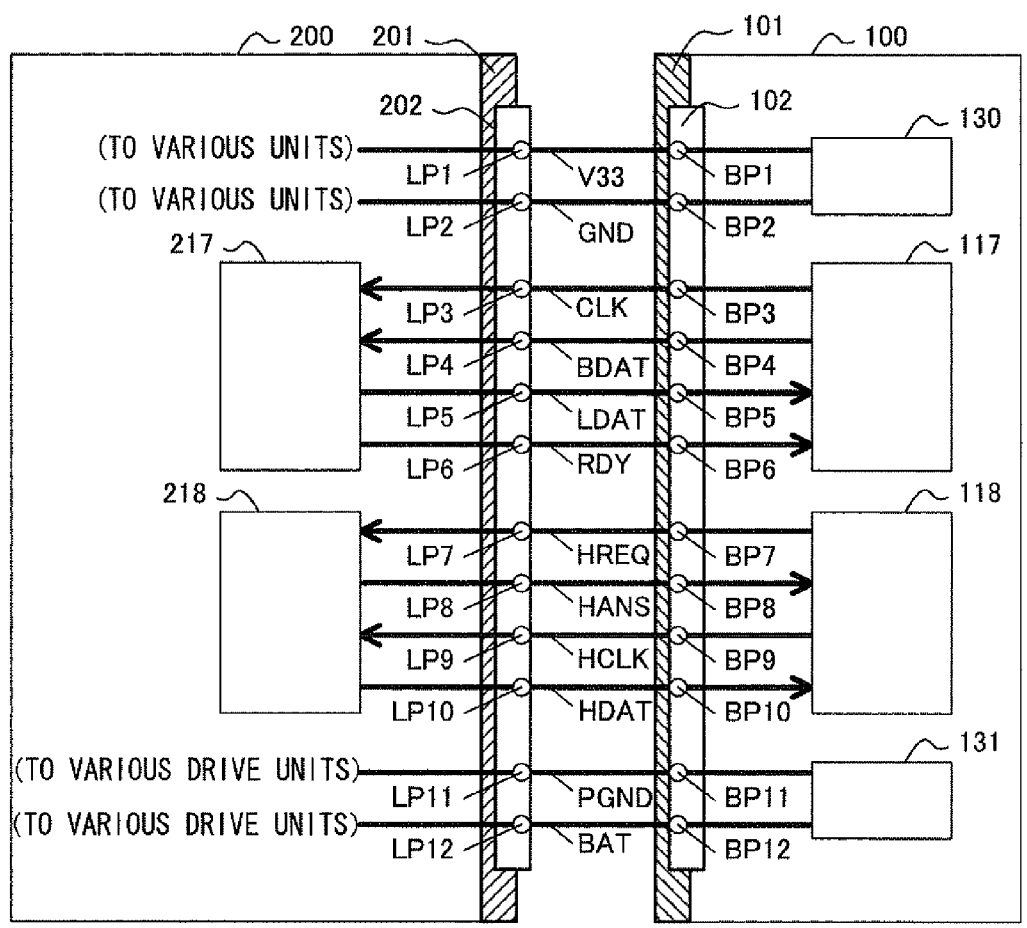
FIG. 3 is a schematic diagram showing in detail holding portions.

FIG. 3 is a schematic diagram showing structural details of the holding portions 102 and 202. It is to be noted that FIG. 3 shows the holding portion 102 set to the right of the lens mount 101, as in the actual mount structure. Namely, the holding portion 102 achieved in the embodiment is disposed at a position inward relative to the mount surface of the lens mount 101 at the camera body 100 (to the right of the lens mount 101 in FIG. 3). Likewise, the holding portion 202 in the figure assumes a position to the right of the lens mount 201 to indicate that the holding portion 202 in the embodiment is disposed at a position outward relative to the mount surface of the lens mount 201 at the exchangeable lens 200. The holding portion 102 and the holding portion 202 disposed with this positional arrangement become connected with each other and the electrical contact points at these holding portions, too, become connected as the camera body 100 and the exchangeable lens 200 are engaged with each other via their mounts by placing the mount surface of the lens mount 101 and the mount surface of the lens mount 201 in contact with each other. Since this mount structure is of the known art, a further explanation or illustration is not provided.

As shown in FIG. 3, twelve contact points BP1 through BP12 are present at the holding portion 102. In addition, twelve contact points LP1 through LP12, each corresponding to one of the twelve contact points at the holding portion 102, are present at the holding portion 202.

The contact point BP1 and the contact point BP2 are connected to a first power source circuit 130 located in the camera body 100. The first power source circuit 130 provides an drive voltage to the contact point BP1, via which the drive voltage is supplied to various components disposed in the exchangeable lens 200 except for circuits such as the focusing lens drive unit 212, the blur correction lens drive unit 213 and the aperture drive unit 214, equipped with drive systems, e.g., actuators, that are bound to consume large amounts of power. In other words, an drive voltage on which the various components in the exchangeable lens 200 except for the drive units listed above are to operate, is provided via the contact point BP1 and the contact point LP1. While a specific range (e.g., a voltage range from equal to or larger than 3 to less than 4 v) defined by a minimum voltage value and a maximum voltage value, is assumed for the voltage value representing the level of voltage that can be provided to the contact point BP1, the voltage value of the voltage typically provided to the contact point BP1 is close to the median of the maximum voltage value and the minimum voltage value. The value of the electrical current provided from the camera body 100 to the exchangeable lens 200 in conjunction with the drive voltage will be in the range of approximately several tens of mA to several hundreds of mA in a power on state.

The contact point BP2 is a ground terminal that corresponds to the drive voltage provided to the contact point BP1. Namely, the contact point BP2 and the contact point LP2 are ground terminals that correspond to the drive voltage.

In the following description, the signal line formed with the contact point BP1 and the contact point LP1 will be referred to as a signal line V33. The signal line formed with the contact point BP2 and the contact point LP2 will be referred to as a signal line GND. These contact points LP1, LP2, BP1 and BP2 are power source-system contact points used to provide power from the camera body 100 to the exchangeable lens 200.

The contact points BP3, BP4, BP5 and BP6 are connected to the first body-side communication unit 117. The contact points LP3, LP4, LP5 and LP6 at the exchangeable lens 200, corresponding to the contact points BP3, BP4, 13P5 and BP6, are connected to the first lens-side communication unit 217. The first body-side communication unit 117 and the first lens-side communication unit 217 exchange data with each other via these contact points (communication-system contact points). The communication carried out by the first body-side communication unit 117 and the first lens-side communication unit 217 will be described in detail later.

It is to be noted that the signal line formed with the contact point BP3 and the contact point LP3 will be referred to as a signal line CLK. In addition, the signal line formed with the contact point BP4 and the contact point LP4 will be referred to as a signal line BDAT, the signal line formed with the contact point BP5 and the contact point LP5 will be referred to as a signal line LDAT and the signal line formed with the contact point BP6 and the contact point LP6 will be referred to as a signal line RDY.

The contact points BP7, BP8, BP9 and BP10 are connected to the second body-side communication unit 118. The contact points LP7, LP8, LP9 and LP10 at the exchangeable lens 200, corresponding to the contact points BP7, BP8, BP9 and BP10, are connected to the second lens-side communication unit 218. The second lens-side communication unit 218 transmits data to the second body-side communication unit 118 via these contact points (communication system contact points). The communication carried out by the second body-side communication unit 118 and the second lens-side communication unit 218 will be described in detail later.

It is to be noted that the signal line formed with the contact point BP7 and the contact point LP7 will be referred to as a signal line HREQ. In addition, the signal line formed with the contact point BP8 and the contact point LP8 will be referred to as a signal line HANS, the signal line formed with the contact point BP9 and the contact point LP9 will be referred to as a signal line HCLK and the signal line formed with the contact point BP10 and the contact point LP10 will be referred to as a signal line HDAT.

The contact point BP11 and the contact point BP12 are connected to a second power source circuit 131 located in the camera body 100. The second power source circuit 131 provides a drive voltage to the contact point BP12, via which the drive voltage is supplied to circuits, such as the focusing lens drive unit 212, the blur correction lens drive unit 213 and the aperture drive unit 214, equipped with drive systems, e.g., actuators, that are bound to consume large amounts of power. In other words, the drive voltage for the focusing lens drive unit 212, the blur correction lens drive unit 213 and the aperture drive unit 214 is supplied via the contact point BP12 and the contact point LP12. While the voltage value indicating the level of voltage that can be provided to the contact point BP12 assumes a range defined by a minimum voltage value and a maximum voltage value, the voltage value is never smaller than the voltage value indicating the level of voltage that can be provided to the contact point BP1 assuming its own specific voltage value range as has been explained earlier (for instance, the maximum voltage value indicating the highest level of voltage that can be provided to the contact point BP12 may be several times the maximum voltage value indicating the highest level of voltage that can be supplied to the contact point BP1). In other words, the voltage value indicating the level of voltage provided to the contact point BP12 is always different from the voltage value indicating the level of voltage provided to the contact point BP1. It is to be noted that the voltage value indicating the level of voltage provided to the contact point BP12 under normal circumstances is close to the median of the maximum voltage value and the minimum voltage value assumed for the contact point BP12. The value of the electrical current provided from the camera body 100 to the exchangeable lens 200 in conjunction with the drive voltage will be in the range of approximately several tens of mA to several A in the power on state.

The contact point BP11 is a ground terminal that corresponds to the drive voltage provided to the contact point BP12. Namely, the contact point BP11 and the contact point LP11 are ground terminals that correspond to the drive voltage.

In the following description, the signal line formed with the contact point BP11 and the contact point LP11 will be referred to as a signal line POND. The signal line formed with the contact point BP12 and the contact point LP12 will be referred to as a signal line BAT. These contact points LP11, LP12, BP11 and BP12 are power source-system contact points used to provide power from the camera body 100 to the exchangeable lens 200.

It is to be noted that as the varying ranges assumed for the voltage value (current value) indicating the level of voltage provided via the contact point BP12 and the contact point LP12 and for the voltage value (current value) indicating the level of voltage provided via the contact point BP1 and LP1 clearly indicate, the difference between the maximum value and the minimum value taken for the electric current flowing through the contact point BP11 and the contact point LP11, i.e., through the ground terminals corresponding to the voltage provided through the contact points BP12 and LP12, is greater than the difference between the maximum value and the minimum value taken for the electric current flowing through the contact point BP2 and the contact point LP2, i.e., the ground terminals corresponding to the voltage provided through the contact points BP1 and LP1. A greater difference is assumed between the maximum value and the minimum value taken for the electric current flowing through the contact points BP11 and LP11, since greater power is used in the various drive units each equipped with a drive system such as an actuator, compared to the power used in the electronic circuits, e.g., the lens control unit 203, in the exchangeable lens 200 and also, a given drive unit does not use any power at all if it does not need to drive the corresponding drive target member.

(Description of Command Data Communication)

The lens control unit 203, concurrently receives control data from the first body-side communication unit 117 and transmits response data to the first body-side communication unit 117 over predetermined first cycles (16 ms cycles in the embodiment) via the contact points LP3 through LP6, i.e., via the signal lines CLK, BDAT, LDAT and RDY, by controlling the first lens-side communication unit 217. The following is a detailed description of the communication carried out by the first lens-side communication unit 217 and the first body-side communication unit 117.

It is to be noted that in the description of the embodiment, the communication carried out by the first lens-side communication unit 217 and the first body-side communication unit 117 respectively under control executed by the lens control unit 203 and the body control unit 103 will be referred to as "command data communication". In addition, the transmission path constituted with the four signal lines used for command data communication (the signal lines CLK, BDAT, LDAT and RDY) will be referred to as a first transmission path. The communication system engaged in command data communication will be referred to as a "command data communication system".

Figure 4:
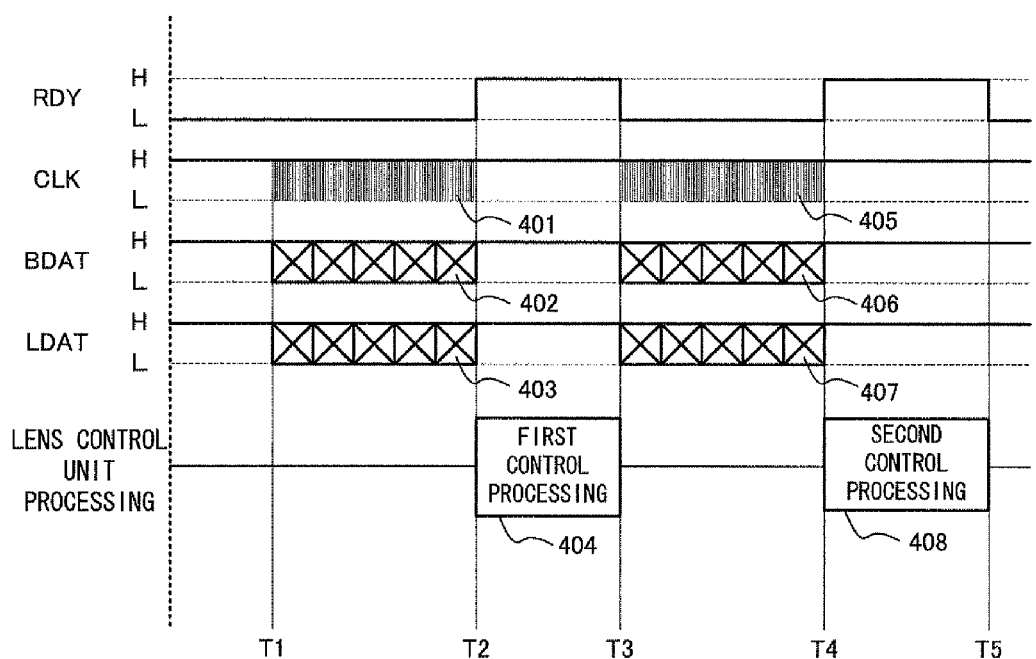
FIG. 4 is a timing chart indicating the timing with which command data communication may be executed.

FIG. 4 is a timing chart indicating the timing with which command data communication may be executed. The body control unit 103 and the first body-side communication unit 117 verify the signal level at the signal line RDY at a command data communication start (T1). The signal level at the signal line RDY indicates whether or not the first lens-side communication unit 217 is in a communication-enabled state. If the first lens-side communication unit 217 is in a communication disabled state, the lens control unit 203 and the first lens-side communication unit 217 output an H (high) level signal through the contact point LP6. In other words, the signal level at the signal line RDY is set to H. Until the signal line RDY holding H level shifts to L level, the body control unit 103 and the first body-side communication unit 117 do not start communication. They do not execute the next phase of processing for any communication in progress either.

Upon verifying that the signal level at the signal line RDY is L (low) level, the body control unit 103 and the first body-side communication unit 117 output a clock signal 401 through the contact point BP3. Namely, the clock signal 401 is transmitted to the first lens-side communication unit 217 through the signal line CLK. In synchronization with the clock signal 401, the body control unit 103 and the first body-side communication unit 117 output a body-side command packet signal 402, which constitutes the first half of control data, via the contact point BP4. Namely, the body-side command packet signal 402 is transmitted to the first lens-side communication unit 217 via the signal line BDAT.

In addition, in synchronization with the clock signal 401 output to the signal line CLK, the lens control unit 203 and the first lens-side communication unit 217 output a lens-side command packet signal 403, which constitutes the first half of response data, via the contact point LP5. Namely, the lens-side command packet signal 403 is transmitted to the first body-side communication unit 117 via the signal line LDAT.

Upon completion of the transmission of the lens-side command packet signal 403, the lens control unit 203 and the first lens-side communication unit 217 set the signal level at the signal line RDY to H (T2). The lens control unit 203 then starts first control processing 404 (which will be described later) corresponding to the contents of the body-side command packet signal 402 having been received.

Upon completing the first control processing 404, the lens control unit 203 notifies the first lens-side communication unit 217 of completion of the first control processing 404. In response to this notification, the first lens-side communication unit 217 outputs an L-level signal via the contact point LP6. In other words, the signal level at the signal line RDY is set to L (T3). In response to the signal level shift, the body control unit 103 and the first body-side communication unit 117 output a clock signal 405 through the contact point BP3. Namely, the clock signal 405 is transmitted to the first lens-side communication unit 217 via the signal line CLK.

In synchronization with the clock signal 405, the body control unit 103 and the first body-side communication unit 117 output a body-side data packet signal 406, which constitutes the second half of the control data, via the contact point BP4. Namely, the body-side data packet signal 406 is transmitted to the first lens-side communication unit 217 via the signal line BDAT.

In addition, in synchronization with the clock signal 405 output to the signal line CLK, the lens control unit 203 and the first lens-side communication unit 217 output a lens-side data packet signal 407, which constitutes the second half of the response data, via the contact point LP5. Namely, the lens-side data packet signal 407 is transmitted to the first body-side communication unit 117 via the signal line LDAT.

Upon completion of the transmission of the lens-side data packet signal 407, the lens control unit 203 and the first lens-side communication unit 217 set the signal level at the signal line RDY to H again (T4). The lens control unit 203 then starts second control processing 408 (which will be described later) corresponding to the contents of the body-side data packet signal 406 having been received.

The first control processing 404 and the second control processing 408 executed by the lens control unit 203 are described next.

The body-side command packet signal 402 may be a request to the exchange lens side for specific data. In such a case, the lens control unit 203 analyzes the contents of the command packet signal 402 and generates the requested specific data through the first control processing 404. Furthermore, as part of the first control processing 404, the lens control unit 203 executes abridged communication error check processing based upon the number of data bytes so as to determine whether or not there has been any error in the communication of the command packet signal 402 by using checksum data contained in the command packet signal 402. The signal carrying the specific data generated through the first control processing 404 is output as the lens-side data packet signal 407 to the body side. It is to be noted that the body-side data packet signal 406 output from the body side following the initial output of the command packet signal 402 in this situation is a dummy data signal (still containing checksum data) which does not carry any significance to the lens side. Under these circumstances, the lens control unit 203 executes communication error check processing such as that described above, by using the checksum data contained in the body-side data packet signal 406 as the second control processing 408.

In another scenario, the body-side command packet signal 402 may be a drive instruction for driving a lens-side drive target member. For instance, the command packet signal 402 may be a drive instruction for the focusing lens 210b and the body-side data packet signal 406 may indicate a drive quantity, i.e., the extent to which the focusing lens 210b needs to be driven. In this case, the lens control unit 203 analyzes the contents of the command packet signal 402 and generates an OK signal acknowledging that the contents have been understood. Furthermore, as part of the first control processing 404, the lens control unit 203 executes communication error check processing as described above by using the checksum data carried in the command packet signal 402. The OK signal generated through the first control processing 404 is then output to the body side as the lens-side data packet signal 407. In addition, the lens control unit 203 analyzes the contents of the body-side data packet signal 406 and executes communication error check processing, such as that described above, by using the checksum data contained in the body-side data packet signal 406 in the second control processing 408.

Upon completing the second control processing 408, the lens control unit 203 notifies the first lens-side communication unit 217 of completion of the second control processing 408. By issuing this notification, the lens control unit 203 prompts the first lens-side communication unit 217 to output an L-level signal through the contact point LP6. Namely, the signal level at the signal line RDY is set to L (T5).

It is to be noted that if the body-side command packet signal 402 is an instruction for driving a lens-side drive target member (e.g., the focusing lens) as described above, the lens control unit 203 engages the focusing lens drive unit 212 in execution of processing through which the focusing lens 210b is driven by the extent matching the drive quantity, while sustaining the signal level at the signal line RDY at L level via the first lens-side communication unit 217.

The communication carried out from the time point T1 through the time point T5 as described above constitutes a single command data communication session. Through the single session of command data communication executed as described above, one body-side command packet signal 402 and one body-side data packet signal 406 are transmitted by the body control unit 103 and the first body-side communication unit 117. Namely, while the processing requires two separate packet signals to be transmitted, the two separate packet signals, i.e., the body-side command packet signal 402 and the body-side data packet signal 406, together constitute a set of control data.

Likewise, one lens-side command packet signal 403 and one lens-side data packet signal 407 are transmitted by the lens control unit 203 and the first lens-side communication unit 217. Namely, the two separate packet signals, i.e., the lens-side command packet signal 403 and the lens-side data packet signal 407, together constitute a set of response data.

As described above, the lens control unit 203 and the first lens-side communication unit 217 receive the control data from the first body-side communication unit 117 and concurrently transmit the response data to the first body-side communication unit 117. The contact point LP6 and the contact point BP6 used for command data communication are contact points via which an asynchronous signal (a signal indicating H (high) level or L (low) level read at the signal line RDY), which is not synchronous with any clock signal, is transmitted.

(Description of Hotline Communication)

The lens control unit 203 transmits lens position data to the second body-side communication unit 118 via the contact point LP7 through LP10, i.e., via the signal lines HREQ, HANS, HCLK and HDAT, by controlling the second lens-side communication unit 218. The following is a detailed description of the communication carried out by the second lens-side communication unit 218 and the second body-side communication unit 118.

It is to be noted that in the description of the embodiment, the communication carried out by the second lens-side communication unit 218 and the second body-side communication unit 118 respectively under control executed by the lens control unit 203 and the body control unit 103 will be referred to as "hotline communication". In addition, the transmission path constituted with the four signal lines used for the hotline communication (the signal lines HREQ, HANS, HCLK and HDAT) will be referred to as a second transmission path. The communication system engaged in hotline communication will be referred to as a "hotline communication system".

Figure 5A:
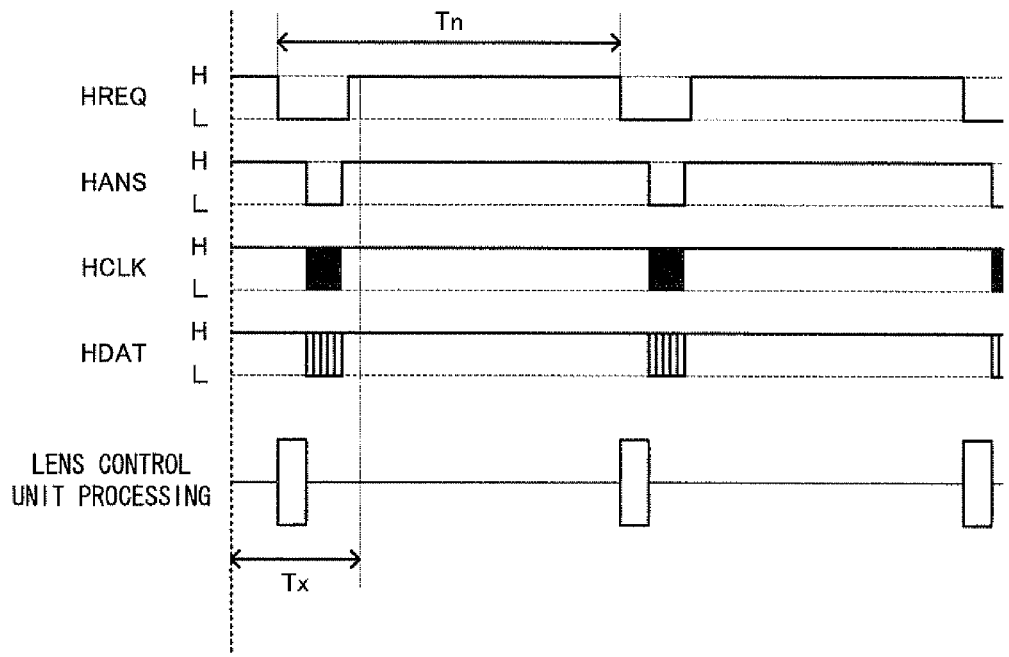
FIGS. 5A and 5B are timing charts indicating the timing with which hotline communication may be executed.
Figure 5B:
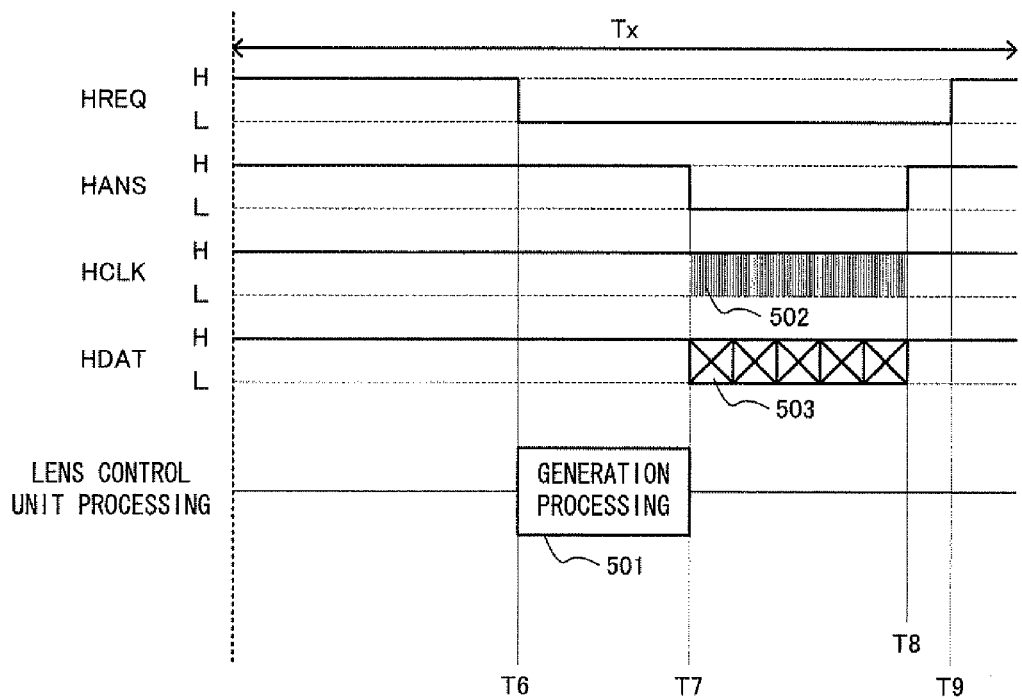

FIGS. 5A and 5B are timing charts indicating the timing with which hotline communication may be executed. The body control unit 103 in the embodiment adopts a structure that allows it to start hotline communication over predetermined second cycles (1 ms cycles in the embodiment). These cycles are shorter than the cycles over which command data communication is executed. FIG. 5A indicates that hotline communication is repeatedly executed over predetermined cycles Tn. FIG. 5B is an enlarged view of a given communication period Tx elapsing as hotline communication is repeatedly executed. The following is a description of the procedure through which hotline communication is carried out, given in reference to the timing chart in FIG. 5B.

The body control unit 103 and the second body-side communication unit 118 first output an L-level signal through the contact point BP7 at a hotline communication start (T6). In other words, the signal level at the signal line HREQ is set to L. The second lens-side communication unit 218 notifies the lens control unit 203 that the signal has been input to the contact point LP7. In response to this notification, the lens control unit 203 starts executing data generation processing 501 in order to generate lens position data. Through the generation processing 501, the lens control unit 203 engages a focusing lens position detection unit (not shown) in detection of the position of the focusing lens 210b and generates lens position data indicating the detection results.

Once the lens control unit 203 completes execution of the generation processing 501, the lens control unit 203 and the second lens-side communication unit 218 output an L-level signal through the contact point LP8 (T7). In other words, the signal level at the signal line HANS is set to L. In response to input of this signal at the contact point BP8, the body control unit 103 and the second body-side communication unit 118 output a clock signal 502 via the contact point BP9. Namely, the clock signal is transmitted to the second lens-side communication unit 218 via the signal line HCLK.

In synchronization with the clock signal 502, the lens control unit 203 and the second lens-side communication unit 218 output a lens position data signal 503 carrying the lens position data through the contact point LP10. In other words, the lens position data signal 503 is transmitted to the second body-side communication unit 118 via the signal line HDAT.

Upon completing the transmission of the lens position data signal 503, the lens control unit 203 and the second lens-side communication unit 218 output an H-level signal through the contact point LP8. In other words, the signal level at the signal line HANS is set to H (T8). In response to input of this signal at the contact point BP8, the second body-side communication unit 118 outputs an H-level signal through the contact point LP7. In other words, the signal level at the signal line HREQ is set to H (T9).

The communication carried out from the time point T6 through the time point T9 as described above constitutes a single hotline communication session. Through the single session of hotline communication executed as described above, a single lens position data signal 503 is transmitted by the lens control unit 203 and the second lens-side communication unit 218. The contact points LP7, LP8, BP7 and BP8, used in hotline communication are contact points via which asynchronous signals, which are not synchronous with any clock signal, are transmitted. In other words, the contact points LP7 and BP7 are contact point via which an asynchronous signal (indicating H (high) level or L (low) level read at the signal line HREQ) is transmitted, whereas the contact points LP8 and BP8 are contact point via which an asynchronous signal (indicating H (high) level or L (low) level read at the signal line HANS) is transmitted.

It is to be noted that command data communication and hotline communication may be executed simultaneously or they may be executed partially concurrently. This means that even while one of the communication units, i.e., the first lens-side communication unit 217 and the second lens-side communication unit 218, is engaged in communication with the camera body 100, the other communication unit is also allowed to communicate with the camera body 100.

(Description of Processing Executed after Power on)

Following a power on operation performed by the user to turn the camera 1 on (by, for instance, operating a power switch (not shown)), the lens control unit 203 (the initialization control unit 223) executes initialization processing to initialize the various components of the exchangeable lens 200. At this time, the body control unit 103 also executes initialization processing to initialize the various components disposed at the camera body 100.

The lens control unit 203 (initialization control unit 223) executing the initialization processing first initializes the first lens-side communication unit 217 and the second lens-side communication unit 218. Likewise, the body control unit 103 first initializes the first body-side communication unit 117 and the second body-side communication unit 118. Through this initialization processing, data communication (command data communication and hotline communication) between the camera body 100 and the exchangeable lens 200 is enabled.

Having initialized the communication units, the lens control unit 203 (initialization control unit 223) starts initialization of the drive target members in the exchangeable lens 200. The exchangeable lens 200 in the embodiment includes a plurality of drive target members (the focusing lens 210, the blur correction lens 210c and the aperture 211). After power to the camera 1 is turned on, the body control unit 103 and the lens control unit 203 cannot execute regular control processing for the drive target members until the initialization control unit 223 completes execution of specific initialization processing. Examples of the regular control processing include drive condition transmission processing executed by the drive condition transmission unit 222 and drive processing executed by the drive control unit 123.

The initialization control unit 223 in the embodiment sequentially executes the initialization processing for the individual drive target members by first initializing the aperture 211, then initializing the blur correction lens 210c and finally initializing the focusing lens 210b. Processing that involves the drive target members cannot be executed at the camera body 100 (body control unit 103) until the initialization processing by the initialization control unit 223 is completed. For instance, until the initialization of the aperture 211 is completed, the aperture diameter at the aperture 211 cannot be adjusted at the camera body 100 (by the body control unit 103) and thus, processing such as exposure control cannot be executed at the camera body 100.

In the embodiment, the initialization status transmission unit 221 transmits initialization status data indicating the initialization status of each drive target member to the camera body 100 (initialization status reception unit 121) over predetermined cycles. The body control unit 103 engages the initialization status reception unit 121 in operation so as to read the initialization status data having been received and sequentially starts control processing for drive target members for which initialization processing has been completed. In other words, the drive control unit 123 does not execute the control processing for any drive target member the initialization status data for which indicate that the execution of the initialization processing is still incomplete.

Figure 6A:
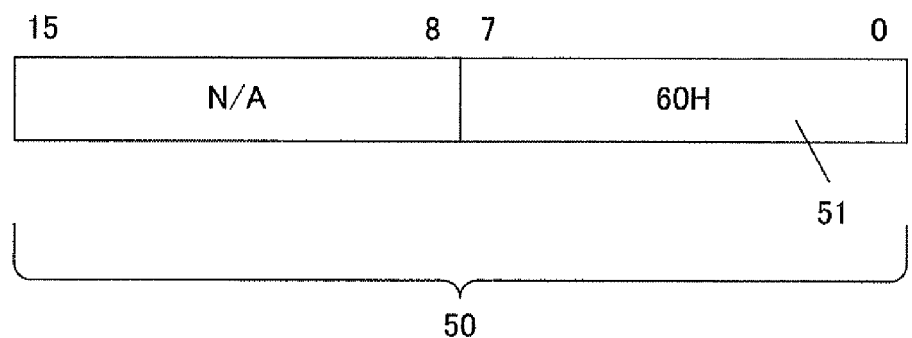
FIGS. 6A and 6B show the structure of initialization status data.
Figure 6B:
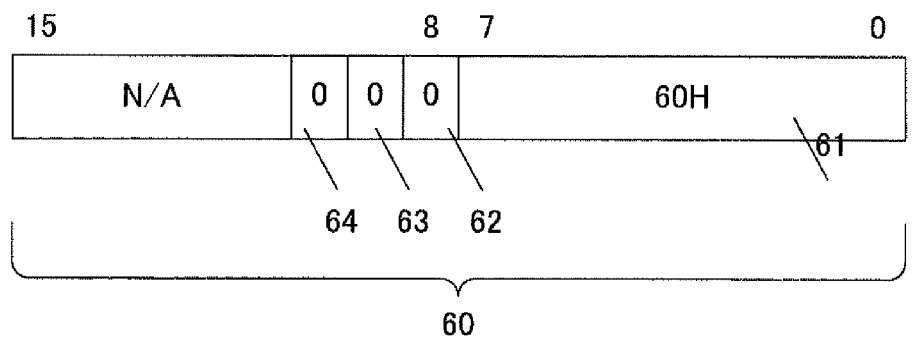

FIGS. 6A and 6B show the structure of information (data) indicating an initialization status. Upon completing the initialization of the individual communication units, the body control unit 103 transmits an initialization status request command (data) 50 shown in FIG. 6A from the first body-side communication unit 117 to the exchangeable lens 200 over predetermined cycles. Upon receiving this initialization status request command (data) 50, the first lens-side communication unit 217 transmits initialization status information (data) 60 shown in FIG. 6B to the first body-side communication unit 117. Namely, the initialization status transmission unit 221 transmits the initialization status information (data) 60 indicating whether or not execution of the initialization processing for each of the plurality of drive target members has been completed to the first body-side communication unit 117 via the first lens-side communication unit 217 over the predetermined cycles (e.g., over 16 ms cycles). The body-side command packet signal 402 and the lens-side data packet signal 407 exchanged in the command data communication, as shown in FIG. 4 respectively correspond to the initialization status request command (data) 50 and the initialization status information (data) 60.

It is to be noted that an area notated as "N/A" in FIGS. 6A and 6B is an area not assigned with any specific data. In other words, any data may be set in the area notated as "N/A". The first body-side communication unit 117 and the first lens-side communication unit 217 simply disregard the data stored in this area.

The initialization status request command (data) 50 shown in FIG. 6A is two-byte data with an integer 51 indicating the identity of the data, i.e., the initialization request command (data) 50, carried in the lower-order byte. While the identifier integer 51 in the example presented in FIG. 6A is a hexadecimal number "60H", the identifier integer may take another number, as long as it indicates the identity of the data, i.e., the initialization status request command (data) 50.

The initialization status information (data) 60 shown in FIG. 6B is two-byte data with an integer 61 indicating the identity of the data, i.e., the initialization status information (data) 60, carried in the lower-order byte. A flag 62 indicating whether or not the execution of the initialization processing for the aperture 211 has been completed is set in the eighth bit. If the initialization processing for the aperture 211 is still incomplete, the initialization status transmission unit 221 transmits initialization status information (data) 60 with 0 set at the flag 62. Likewise, a flag 63 indicating whether or not the execution of the initialization processing for the blur correction lens 210c has been completed is set in the ninth bit, and a flag 64 indicating whether or not the execution of the initialization processing for the focusing lens 210b has been completed is set in the tenth bit.

Figure 7:
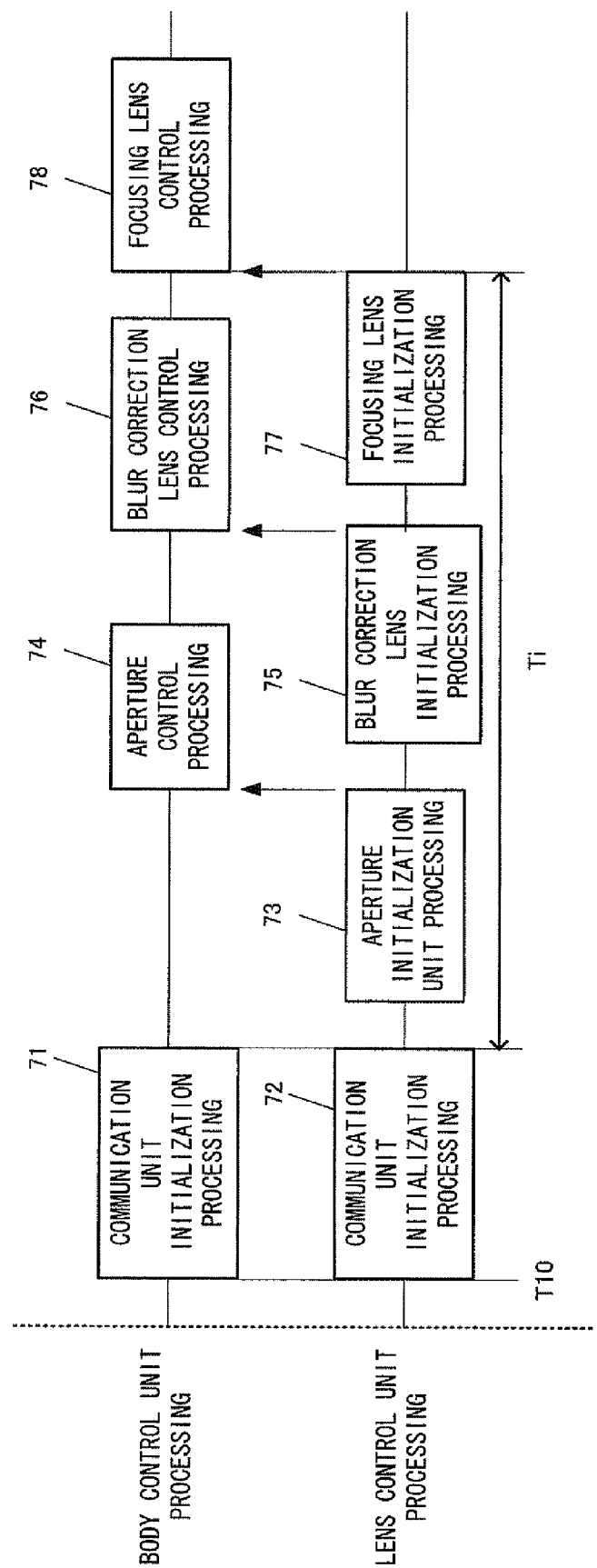

FIG. 7 is a time chart indicating the procedure through which the initialization processing is executed after power is turned on. As a power on operation is performed at the camera 1 at a time point T10, the body control unit 103 starts initialization processing 71 for the individual body-side communication units. The lens control unit 203 (initialization control unit 223), too, starts initialization processing 72 for the individual lens-side communication units.

Upon completing the initialization processing 71 for the communication units, the body control unit 103 starts the transmission of the initialization status request command (data) 50 described earlier. Subsequently, the body control unit 103 repeatedly transmits the initialization status request command (data) 50 over the predetermined cycles until control processing 78 executed as described later for the focusing lens 210b is completed (i.e., it repeatedly transmits the initialization status request command (data) 50 during a period Ti).

Upon completing the initialization processing 72 for the communication units, the lens control unit 203 (initialization control unit 223) starts initialization processing 73 for the aperture 211. The initialization processing 73 executed for the aperture 211 may include, for instance, home position resumption processing for the aperture actuator (not shown) that drives the aperture 211. Through the home position resumption processing, the aperture 211 is driven to an aperture maximum open setting (the position at which the aperture 211 is driven to a contact position with a mechanical regulator present at the aperture maximum side, at which the aperture achieves a fully open state) by driving the aperture actuator. Until the execution of the initialization processing 73 for the aperture 211 by the initialization control unit 223 is completed, the lens control unit 203 (initialization status transmission unit 221) transmits initialization status information (data) 60 with the flag 62, the flag 63 and the flag 64 all indicating 0 via the first lens-side communication unit 217 (to the camera body 100) each time the initialization status request command (data) 50 transmitted from the camera body 100 is received.

It is to be noted that one of two different types of processing is executed as the initialization processing for the aperture 211. The first type of processing will be referred to as initialization processing 1, executed in response to a power on operation (startup) at the camera having been in a "power off state", in which the power switch at the camera body 100 is in the off state. The other type of processing will be referred to as initialization processing 2, executed when starting up the camera having been in a "sleep state", in which the camera body assumes a power-saving mode while the power switch on the camera body side remains on. The position assumed by the aperture 211 (control aperture position) before entering the sleep state is stored into a memory within the lens control unit 203 as the camera body shifts into the sleep state.

As the initialization processing 1, the home position resumption processing is executed for the aperture actuator (not shown) that drives the aperture 211 as described earlier.

In the initialization processing 2, the home position resumption processing is first executed for the aperture actuator as described above and then control is executed to drive the aperture 211 to the aperture position (control aperture position) assumed prior to the shift into the sleep state, having been stored in the memory within the lens control unit 203.

The body control unit 103, having ascertained the current state of the camera body, i.e., recognizing the power off state or the sleep state, transmits the information (parameter) indicating whether the lens control unit 203 is to engage in the initialization processing 1 or in the initialization processing 2, to the lens control unit 203 when it issues an initialization start instruction to the lens control unit 203. Based upon this parameter, the lens control unit 203 executes either the initialization processing 1 or the initialization processing 2.

Once execution of the initialization processing 73 for the aperture 211 is completed (i.e., once the initialization of the aperture 211 is completed and the regular aperture control is enabled), the initialization status transmission unit 221 transmits initialization status information (data) 60 with 1 set for the flag 62. Upon receiving the initialization status information (data) 60 with the flag 62 indicating 1, the body control unit 103 engages the drive control unit 123 in operation so as to start execution of control processing 74 for the aperture 211. Types of control processing executed for the aperture 211 may include, for instance, photometric calculation processing, through which photometering information needed for exposure control is generated based upon the output from the image sensor 104 located in the body and aperture position information acquisition processing through which the current position of the aperture 211 is detected. In addition, depending upon the photographing mode and photographing conditions such as the subject brightness indicated in the photometering information mentioned above, photographic aperture control processing through which control is executed to adjust the aperture 211 to a control target photographic aperture value for the photographing operation may also be executed as part of the control processing for the aperture 211.

Following the initialization processing for the aperture 211, the lens control unit 203 (initialization control unit 223) sequentially executes initialization processing 75 for the blur correction lens 210e and initialization processing 77 for the focusing lens 210b. In other words, the lens control unit 203 (initialization control unit 223) in the embodiment completes the initialization processing for the aperture 211 ahead of the initialization processing executed for the other drive target members. Each time the initialization processing executed for a specific drive target member is completed, the initialization status transmission unit 221 switches the corresponding flag (the flag 63 or the flag 64) in the initialization status information (data) 60 to be transmitted next from 0 to 1. The body control unit 103 detects such a switch at the flag (i.e., the completion of the corresponding initialization processing) and then engages the drive control unit 123 in execution of control processing for the drive target member judged to be ready for control other than the initialization processing based upon the switch at the particular flag. The control processing executed for the drive target members includes control processing 76 for the blur correction lens 210c and control processing 78 for the focusing lens 210b. Through the blur correction lens control processing 76, a centering processing operation for centering the blur correction lens and an operation for obtaining the blur correction lens position information indicating the position of the blur correction lens having been centered via the command data communication system rather than the hotline communication system described earlier, may be executed. Through control processing 78 for the focusing lens 210b, data related to focusing processing having been stored in the internal memory at the body (e.g. defocus information indicating the extent of defocusing having been stored for the immediately preceding focusing processing) may be cleared from the memory. Then, as the initialization processing executed for the individual drive target members, as indicated in FIG. 7 is completed and also all the control processing for the individual drive target members is completed, the camera 1 executes photographing preparatory operations (e.g., focusing lens control, blur correction lens control, aperture control and the like) and subsequently enters a photographing-enabled state, in response to an operation performed at an operation member to issue a photographing start instruction (e.g., a halfway press operation or full press operation at the shutter release button).

As does the initialization processing 73 for the aperture 211 described earlier, the initialization processing 77 for the focusing lens 210b includes home position resumption processing for the focusing lens actuator (not shown) that drives the focusing lens 210. Through this home position resumption processing, the focusing lens 210b is driven to a reference position (e.g., a telephoto end position or a wide-angle end position) selected in advance for the focusing lens 210b. It is to be noted that a decision as to whether or not the focusing lens 210b has reached the reference position is made based upon detection results provided by a sensor (a photo interrupter (not shown)) installed in the exchangeable lens, and the lens control unit 203 executes control to stop the focusing lens actuator based upon the detection results provided by the sensor.

It is to be noted that either of the two different types of processing (initialization processing 1 executed in response to a power on operation (startup operation) performed at the camera having been in the "power off state" and initialization processing 2 executed to startup of the camera body in the "sleep state") is executed as the initialization processing 77 for the focusing lens 210b, as is the case with the initialization processing 73 for the aperture 211 described earlier. Details of the initialization processing 1 and the initialization processing 2 are similar to those of the initialization processing 73 executed for the aperture 211 and the only difference is that the drive target is the focusing lens 210b rather than the aperture 211. Accordingly, a repeated explanation is not provided.

Through the initialization processing 75 executed for the blur correction lens 210c, a correction value, to be used to correct the output of a position detection sensor that detects the position of the blur correction lens 210c, is calculated. The position detection sensor used to detect the position of the blur correction lens 210c in the embodiment is an inexpensive sensor (e.g., a Hall sensor). The output of such a position detection sensor is bound to vary as the ambient temperature changes. For this reason, the output of the position detection sensor needs to be corrected in correspondence to the ambient temperature so as to ensure that accurate position detection is enabled at any ambient temperature. Through the correction processing executed as part of the initialization processing 75, the correction value is calculated in correspondence to the ambient temperature and the correction value thus calculated is stored in the memory at the lens control unit 203. The processing executed up to the point at which the correction value is stored constitutes the initialization processing 75. Then, as the actual position assumed by the blur correction lens 210c is detected, the output of the position detection sensor that detects the position of the blur correction lens 210c is corrected based upon the corresponding correction value stored in the memory at the lens control unit 203. It is to be noted that the ambient temperature is detected via a temperature sensor (not shown) installed on a circuit board in the lens.

It is to be noted that, in order to save power, home position resumption processing for the blur correction lens 210c (i.e., processing through which the blur correction lens 210c is driven to a predetermined reference position so as to, for instance, align the center of the blur correction lens 210c with the center of the optical axis of the exchangeable lens 200) is not executed as part of the initialization processing 75, in the embodiment.

(Description of Drive Condition Data)

Figure 8:
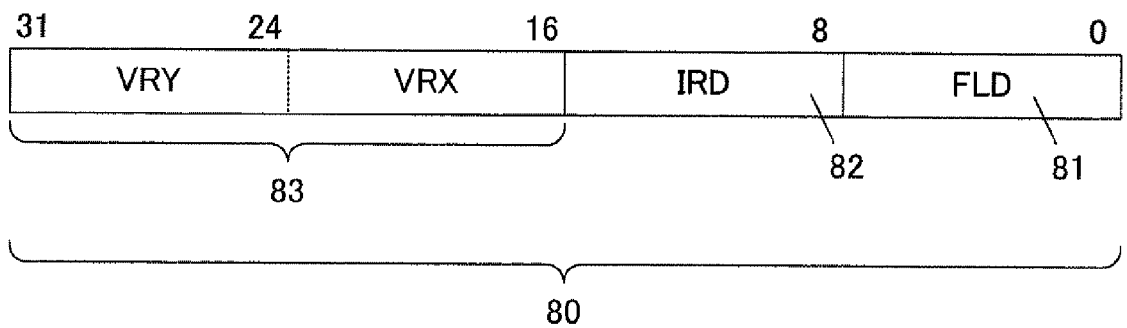
FIG. 8 shows the structure of the drive conditions data.

FIG. 8 shows the structure of the drive condition information (data). The drive condition information (data) indicates the drive conditions at the drive target members in the exchangeable lens 200. The drive condition transmission unit 222 transmits drive condition information (data) 80 shown in FIG. 8 to the camera body 100 (drive condition reception unit 122) over predetermined cycles (e.g., 1 ms cycles). The drive condition information (data) 80 is transmitted through hotline communication. Namely, the drive condition information (data) 80 is transmitted from the second lens-side communication unit 218 to the second body-side communication unit 118 through the second transmission path. Once the initialization of all the drive target members is completed, the drive condition transmission unit 222 starts transmission of information indicating the drive conditions at the individual drive target members. In other words, until the initialization control unit 223 completes the initialization processing for all the drive target members, the transmission of the drive condition information (data) 80 does not start. This means that only after the initialization status reception unit 121 receives the initialization status information (data) 60 indicating that the initialization of all the drive target members has been completed, the drive condition reception unit 122 at the camera body 100 outputs a request signal to the exchangeable lens 200 through the hotline communication system described earlier and thus starts receiving the drive condition information (data) 80 sent thereto in response to the request signal. The sequence through which the drive condition transmission unit 222 transmits the drive condition information (data) to the camera body 100 over predetermined cycles (over second cycles) is now described. The camera body 100 outputs a signal (request signal) requesting the drive condition information (data) to the exchangeable lens 200 over the second cycles (e.g., 1 ms cycles). The drive condition transmission unit 222 at the exchangeable lens 200 responds to the request signal by transmitting drive condition information (data) it has prepared. Through this sequence, the drive condition transmission unit 222 is able to transmit the drive condition information (data) to the camera body 100 over the predetermined second cycles.

The drive condition information (data) 80 is four byte data that include position data 81 indicating the position of the focusing lens 210b, opening diameter data 82 indicating the opening diameter assumed at the aperture 211 and position data 83 indicating the position of the blur correction lens 210c. The position data 81 indicate, with a one-byte integer in a range of 0 through 255, the position of the focusing lens 210b among various positions that may be assumed between the close-up position and the infinity position, each corresponding to a specific value in the 0 through 255 range. Likewise, the opening diameter data 82 indicate the opening diameter assumed at the aperture 211 as a one-byte integer in the range of 0 through 255, among various settings between the maximum aperture setting (maximum opening diameter) and the minimum aperture setting (minimum opening diameter), each corresponding to a specific value in the 0 through 255 range. The position data 83 indicate the position of the blur correction lens 210c with two sets of one-byte integer data combined together. The position of the blur correction lens 210c assumed on a plane perpendicular to the optical axis of the image forming optical system 210 is indicated with a value in the 0 through 255 range taken along the x-axis and a value in the 0 through 255 range taken along the y-axis.

The body control unit 103 obtains the current drive conditions of the various drive target members by referencing the drive condition data 80 received by the drive condition reception unit 122. Then, based upon the drive conditions thus ascertained, it engages the drive control unit 123 in drive control. For instance, while driving the focusing lens 210b, a decision as to whether or not the focusing lens 21b has been driven to the target position is made by referencing the drive condition data 80.

(Description of Processing Executed During a Period Following Power on Operation Until Photographing Operation is Enabled)

Figure 9:
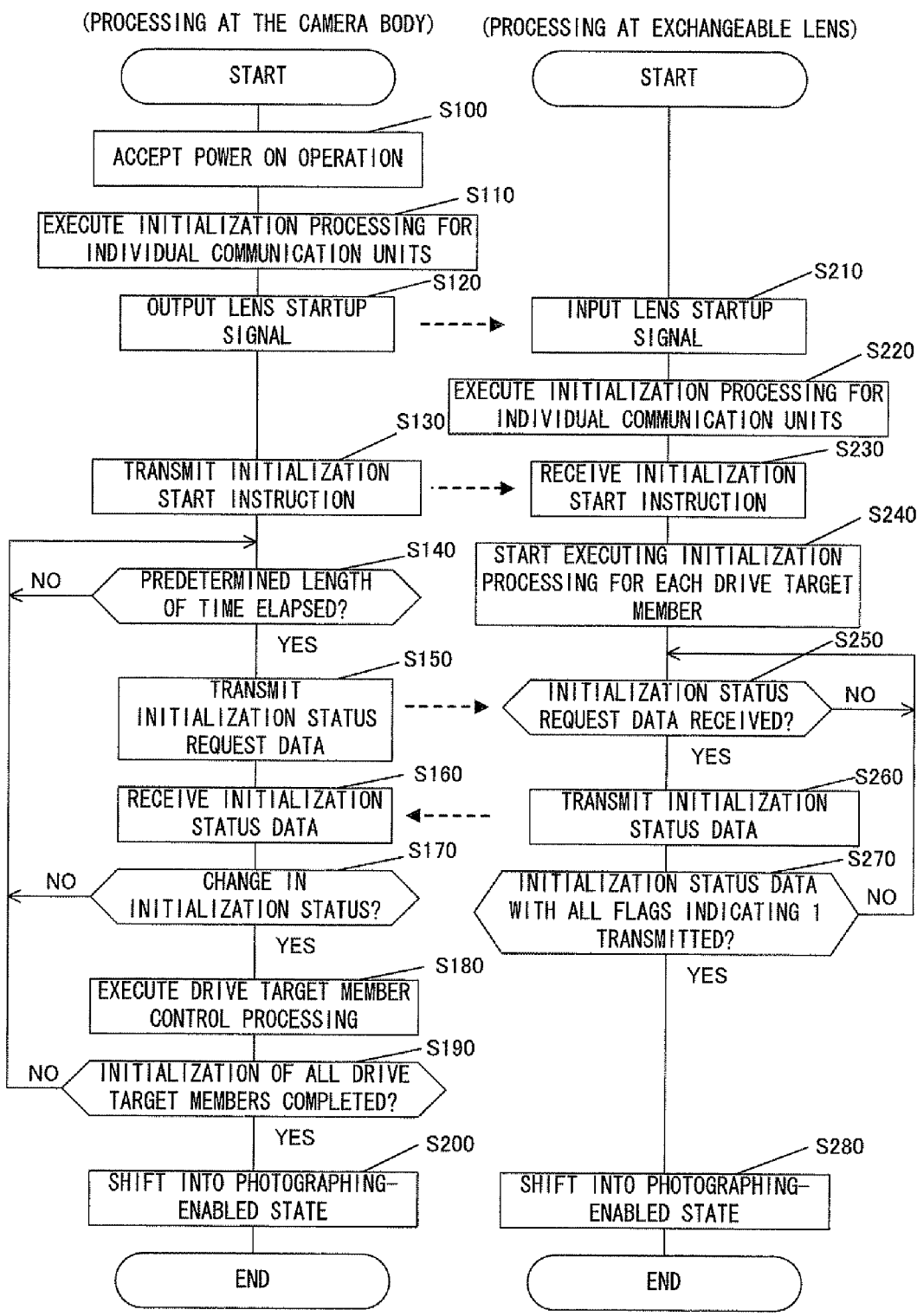
FIG. 9 presents a flowchart of the processing executed at the camera body and the exchangeable lens during a period following a power on operation and preceding a point at which a photographing-enabled state is achieved.

FIG. 9 presents a flowchart of the processing executed during the period following a power on operation until the camera enters a photographing-enabled state. The processing executed by the body control unit 103 is shown on the left side of FIG. 9, whereas the processing executed by the lens control unit 203 is shown on the right side of FIG. 9. The processing executed by the body control unit 103 will be described first.

In step S100, the body control unit 103 accepts a power on operation performed by the user. In step S110, the body control unit 103 executes the initialization processing for the first body-side communication unit 117 and the second body-side communication unit 118. In step S120, the body control unit 103 outputs a specific lens startup signal to the exchangeable lens 200 via a contact point at the holding portion 102. In step S130, the body control unit 103 engages the first body-side communication unit 117 in operation so as to transmit a specific initialization start instruction.

In step S140, the body control unit 103 makes a decision as to whether or not a predetermined length of time (e.g., 16 ms) has elapsed following the execution of the processing in step S130. The body control unit 103 repeatedly executes the processing in step S140 until the predetermined length of time elapses. If it is decided that the predetermined length of time has elapsed, the processing proceeds to step S150. In step S150, the body control unit 103 transmits an initialization status request command (data) 50 to the exchangeable lens 200. In step S160, the initialization status reception unit 121 receives initialization status information (data) 60. In step S170, the body control unit 103 makes a decision as to whether or not there has been any change in the initialization statuses indicated in initialization status information (data) 60 having been received previously by referencing the initialization status information (data) 60 received in step S160 in the current session. If it is decided that the initialization statuses have not changed, the operation proceeds to step S140 to wait in standby for a predetermined length of time after execution of the processing in step S170. If, on the other hand, it is decided that a change has occurred in an initialization status, the operation proceeds to step S180, in which the drive control unit 123 executes specific control processing for the drive target member, the initialization status of which has changed. In step S190, the body control unit 103 makes a decision as to whether or not all the drive target members have been completely initialized. If there is any drive target member not yet initialized, the operation returns to step S140 to wait for a predetermined length of time after execution of the processing in step S190. If, on the other hand, it is decided that the initialization of all the drive target members has been completed, the operation proceeds to step S200 to shift the camera body 100 into a photographing-enabled state.

Next, the processing executed by the lens control unit 203 is described. In step S210, the lens startup signal is input from the camera body 100. The lens control unit 203 begins startup processing in response to this signal. In step S220, the initialization control unit 223 executes initialization processing for the first lens-side communication unit 217 and the second lens-side communication unit 218. In step S230, the lens control unit 203 receives the initialization start instruction from the camera body 100. In step S240, the initialization control unit 223 sequentially starts initialization processing for the various drive target members. The initialization control unit 223 first starts the initialization processing for the aperture 211, and upon completing the initialization processing for the aperture 211, it starts initialization processing for the other drive target members in sequence. As explained earlier, the initialization control unit 223 executes the initialization processing for one drive target member at a time.

In step S250, the lens control unit 203 makes a decision as to whether or not an initialization status request command (data) 50 from the camera body 100 has been received. Until an initialization status request command (data) 50 is received, the lens control unit 203 repeatedly executes the processing in step S250. Once an initialization status request command (data) 50 is received, the operation proceeds to step S260. In step S260, the initialization status transmission unit 221 transmits initialization status information (data) 60 to the camera body 100. In step S270, the lens control unit 203 makes a decision as to whether or not the various flags in the initialization status information (data) 60 having just been transmitted in the preceding step S260 all indicate "1". If a negative decision is made in step S270, the operation returns to step S250. However, if it is decided that all the flags indicate 1 in the initialization status information (data) 60 having been transmitted, the operation proceeds to step S280. In step S280, the lens control unit 203 shifts the exchangeable lens 200 into a photographing-enabled state.

The following operational effects are achieved with the camera system in the first embodiment described above.

(1) The initialization control unit 223 executes specific initialization processing for each of the drive target members. The initialization status transmission unit 221 transmits initialization status information (data), which indicates whether or not the execution of the initialization processing for each of the drive target members has been completed, to the camera body 100. Since the initialization statuses are transmitted from the exchangeable lens 200 to the camera body 100, the length of time required to detect the completion of initialization of the exchangeable lens can be reduced.

In addition, the initialization status information (data) is transmitted to the camera body 100 via the first transmission path (command data communication system) over predetermined cycles (e.g., over 16 ms cycles, in response to the request command issued from the camera body side over the predetermined first cycles). Since the initialization statuses are transmitted on a regular basis from the exchangeable lens 200 to the camera body 100 over predetermined cycles as described above, the length of time required to detect the completion of initialization of the exchangeable lens can be reduced.

In addition, once the initialization of the individual drive target members is completed, the drive condition transmission unit 222 transmits drive condition data, indicating the drive conditions of the drive target members, to the camera body 100 through the second transmission path (hotline communication system) over predetermined cycles. Through these measures, the conditions of the drive target members can be ascertained at the camera body 100 as soon as the initialization processing is completed.

(2) The initialization control unit 223 completes the initialization processing for the aperture 211 ahead of the initialization processing for the other drive target members. Through the initialization processing executed in the embodiment for the aperture member, the aperture 211 is set to achieve the maximum aperture (initialization processing 1) or to achieve the photographing aperture opening having been stored before a shift to the sleep state (initialization processing 2). In other words, the aperture 211 is initialized by adjusting it to a photometering-ready state (the aperture is adjusted for maximum-aperture photometering or for photographing aperture photometering) corresponding to the current conditions. As a result, the camera body 100 is able to start preparing for a photometering operation (by executing, for instance, photometric calculation processing based upon the image sensor output as described earlier) without having to wait for the initialization of the other drive target members to be completed, making it possible to reduce the length of time required to achieve the photographing-enabled state.

(3) The initialization status transmission unit 221 in the exchangeable lens 200 transmits initialization status data 60, indicating the initialization statuses of the drive target members, to the camera body 100 over predetermined cycles. Thus, the camera body 100 is able to ascertain the statuses of the individual drive target members with a high level of accuracy each time it receives the initialization status data 60, and is able to execute optimal preparatory operation on the camera body side in correspondence to the initialization statuses. As a result, the length of time to elapse before the photographing-enabled state is achieved can be reduced.

(4) The initialization control unit 223 executes initialization processing for the individual drive target members in a predetermined sequence by executing initialization processing for one drive target member at a time. Through these measures, the order with which the executions of the initialization processing for the individual drive target members are completed can remain unchanged at all times, and, as a result, better ease of control is assured.

(5) The drive condition reception unit 122 starts receiving information indicating the drive conditions of the drive target members only after initialization status data 60 indicating that the initialization of the drive target members has been completed is received by the initialization status reception unit 121. As a result, inaccurate drive condition information regarding a drive target member yet to be fully initialized is never received (6) The drive control unit 123 does not execute the specific control processing for any drive target member, the execution of the initialization processing for which is indicated to be incomplete in the initialization status data 60. Through these measures, it is ensured that no incorrect drive control is executed for the drive target member yet to be fully initialized.

Second Embodiment

The camera system achieved in the second embodiment of the present invention adopts a structure similar to that of the camera system achieved in the first embodiment. The second embodiment differs from the first embodiment in the order with which (procedure through which) the initialization control unit 223 executes initialization processing for the drive target members. It is to be noted that the second embodiment will be described by quoting the same reference numerals whenever referring to details identical to those of the first embodiment.

Figure 10:
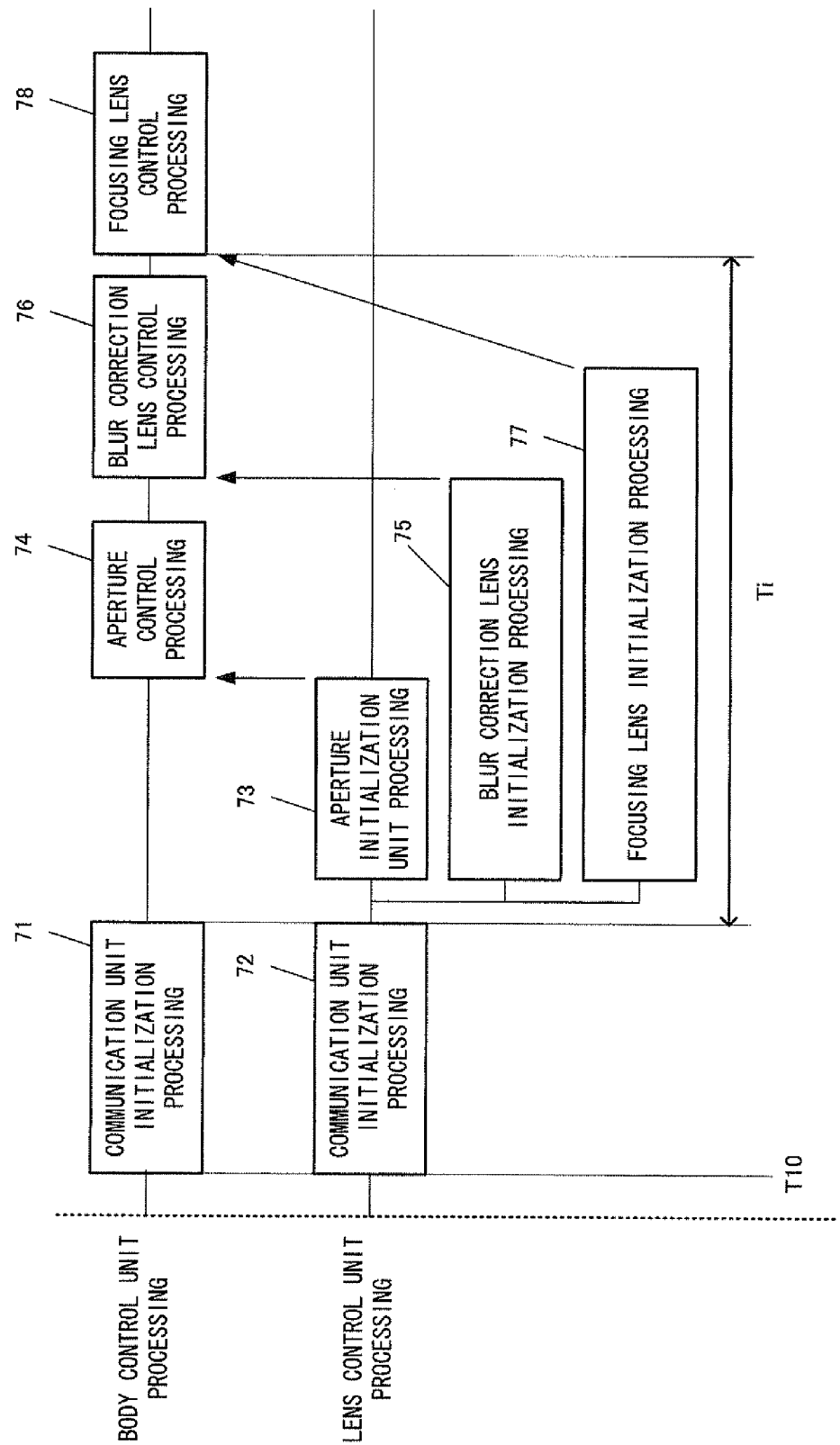

FIG. 10 is a time chart indicating the procedure through which the initialization processing is executed following a power on operation. The initialization control unit 223 in this embodiment concurrently executes the initialization processing for all the drive target members after initialization processing 72 is executed for the communication units. Namely, initialization processing 73 for the aperture 211, initialization processing 75 for the blur correction lens 210c and initialization processing 77 for the focusing lens 210b are all started at once. The length of time required for execution of the initialization processing is different for each of the drive target members and, accordingly, the body control unit 103 starts executing the control processing for each drive target member as soon as the initialization of the particular drive target member is completed. For instance, as the aperture initialization processing 73 ends first, execution of aperture control processing 74 immediately starts, as shown in FIG. 10. Then, once execution of the aperture control processing 74 is completed, the body control unit 103 waits in standby for completion of execution of the initialization processing for another drive target member. Subsequently, each time execution of the initialization processing is completed, the corresponding control processing (e.g., blur correction lens control processing 76 or focusing lens control processing 78) is executed.

It is to be noted that as has been described in reference to the first embodiment, either of the two different types of processing (i.e., the processing executed when starting up from the power off state and the processing executed when starting up from the sleep state) is executed as the initialization processing 73 and also as the initialization processing 77.

The operational flow followed in the second embodiment is substantially identical to the operational flow shown in FIG. 9. The operational flow in the second embodiment is distinguishable from the operational flow in the first embodiment shown in FIG. 9 in that the initialization control unit 223 "simultaneously starts" the initialization processing for the individual drive target members in step S240 in the second embodiment.

In addition to the operational effects of the camera system in the first embodiment, the following operational effects are achieved with the camera system in the second embodiment described above.

(1) The initialization control unit 223 simultaneously starts execution of the initialization processing for the plurality of drive target members. Since the initialization processing for the different drive target members is executed concurrently, the overall length of time required to complete the initialization of all the drive target members can be reduced, which, in turn, makes it possible to shorten the length of time to elapse before the photographing-enabled state is achieved.

(2) The initialization control unit 223 simultaneously starts execution of the initialization processing for the plurality of drive target members. Each time the initialization processing for a given drive target member is completed, the exchangeable lens 200 transmits information indicating the completion of the particular initialization processing to the camera body side. As a result, the camera body is able to immediately ascertain the completion of the initialization processing for a particular drive target member and is thus able to start camera body-side photographing preparatory operations in a sequence matching the order with which the individual drive target members become fully initialized. As a result, the length of time to elapse before the photographing-enabled state is achieved can be further reduced.

The present invention allows for the following variations and one of the variations or a plurality of variations may be adopted in combination with either of the embodiments described above.

(Variation 1)

In either of the embodiments described above, the drive condition transmission unit 222 does not transmit the drive condition information until the initialization for all the drive target members is completed. As an alternative, it may start transmitting the drive condition information in sequence by transmitting the drive condition information for a drive target member as soon as the initialization thereof is completed. For instance, variable length data may be used as the drive condition data 80, and the transmission of information related to the opening aperture at the aperture 211 alone may be enabled so as to start transmitting information indicating the drive conditions of the aperture 211 as soon as initialization of the aperture 211 is completed.

(Variation 2)

A member other than the aperture, the focusing lens or the blur correction lens may be designated as a drive target member. In addition, the drive target members may be initialized in an order different from the order in which they are initialized in the embodiments described above.

(Variation 3)

The exchangeable lens 200 in the embodiments is configured so as to transmit drive condition information indicating the drive conditions of the plurality of drive target members as drive target member drive condition information to be sent to the camera body side through the hotline communication system (see FIG. 8). However, the present invention is not limited to an application in which drive condition information for a plurality of drive target members is transmitted, and it may instead be adopted in an application in which drive condition information indicating the drive conditions of one of the plurality of drive target members is transmitted. Furthermore, it may be adopted in conjunction with an exchangeable lens 200 that includes only one drive target member.

(Variation 4)

The exchangeable lens 200 in the embodiments is configured so as to transmit the initialization status data 60 to the camera body 100 over the predetermined first cycles through the command data communication system. As an alternative, the camera body side may be notified of any change in the status of the initialization processing more quickly until the initialization processing at the exchangeable lens 200 is completed. For instance, until the initialization processing executed for all the drive target members is completed at the exchangeable lens 200, the communication cycles through the command data communication system may be shortened. In more specific terms, control may be executed so as to shorten the communication cycles, over which the camera body 100 and the exchangeable lens 200 communicate with each other through the command data communication system, relative to the predetermined first cycles. Since this allows the camera body 100 to be notified immediately that the initialization processing for each drive target member has been completed, the length of time to elapse before the photographing preparatory operations are executed and the length of time to elapse before the photographing operation is executed can be reduced.

(Variation 5)

In the initialization processing 75 executed for the blur correction lens 210c in the embodiments, the blur correction lens 210c may be driven to a reference position. For instance, the blur correction lens 210c may be driven so as to align the center of the blur correction lens 210c with the optical axis of the photographic lens 200 through the initialization processing 75. Such home position resumption processing may be incorporated into the initialization processing 75 for the blur correction lens 210c as long as sufficient battery power is available on the camera body side.

(Variation 6)

While the initialization processing 73, the initialization processing 75 and the initialization processing 77 for the three different drive target members are started simultaneously in the second embodiment described above, the present invention is not limited to this example and the initialization processing for any two drive target members may start simultaneously with the initialization processing for the remaining one drive target member started with different timing.

(Variation 7)

Each time the initialization processing status corresponding to a given drive target member changes (each time the initialization processing for a drive target member ends), information indicating the change is transmitted to the camera body side in the embodiments described above. However, the present invention is not limited to this example. For instance, the present invention may be adopted in a camera system in which information indicating the initialization processing for all the drive target members has not yet been completed (e.g., information indicating the entire initialization processing has not yet been completed, with the flags 62 through 64 in the initialization status data 60 in FIG. 6 all indicating "0") may be transmitted from the exchangeable lens side until the initialization processing for all the drive target members undergoing initialization is completed. In this case, upon completing the initialization processing for all the drive target members, information indicating that the initialization processing for all the drive target members has been completed, with, for instance, the flags 62 through 64 all indicating "1" in the initialization status data 60 in FIG. 6 will be transmitted. This structure, too, allows the exchangeable lens to indicate to the camera body the completion of the entire initialization processing as soon as it is completed.

As described above, the length of time required for initialization of the exchangeable lens can be reduced by adopting any of the embodiments of the present invention or any variation thereof.

As long as the features characterizing the present invention are not compromised, the present invention is not limited to the particulars of the embodiments described above and other modes that are conceivable within the technical scope of the present invention are also within the scope of the invention.

What is claimed is:

1. An exchangeable lens, comprising:
a mount unit at which a camera body is detachably engaged;
a plurality of drive target members, conditions of which change as a drive force is applied thereto;
an initialization unit that executes initialization processing for each of the plurality of drive target members;
an initialization status transmission unit that transmits initialization statuses, each indicating a status of the initialization processing executed for one of the drive target members, to the camera body via a first transmission path over predetermined first cycles; and
a drive condition transmission unit that transmits a drive condition of at least one drive target member among the plurality of drive target members to the camera body via a second transmission path different from the first transmission path over predetermined second cycles different from the predetermined first cycles.

2. An exchangeable lens according to claim 1, wherein:
after a change occurs in the initialization status of at least one drive target member among the plurality of drive target members, the drive condition transmission unit starts transmitting the drive condition of the drive target member, the initialization status of which has changed.

3. An exchangeable lens according to claim 2, wherein:
after the initialization statuses of all the drive target members for which initialization processing is executed by the initialization unit change, the drive condition transmission unit starts transmitting at least the drive condition of the one drive target member.

4. An exchangeable lens according to claim 2, wherein:
the initialization unit starts executing initialization processing for all the drive target members at once.

5. An exchangeable lens according to claim 2, wherein:
one of the drive target members is an aperture; and
the initialization unit completes initialization processing for the aperture ahead of the initialization processing for another drive target member.

6. An exchangeable lens according to claim 5, wherein:
until the initialization unit completes initialization processing for the aperture, the initialization status transmission unit transmits the initialization status information indicating that the initialization processing for a drive target member other than the aperture is not complete.

7. An exchangeable lens according to claim 2, wherein:
the initialization unit initializes the drive target members in a predetermined order by executing the initialization processing for one drive target member at a time.

8. An exchangeable lens, comprising:
a mount unit at which a camera body is detachably engaged;
a plurality of drive target members, conditions of which change as a drive force is applied thereto;
an initialization unit that executes initialization processing for each of the plurality of drive target members;
an initialization status transmission unit that transmits initialization statuses, each indicating a status of the initialization processing executed for one of the drive target members, to the camera body via a first transmission path over predetermined first cycles; and
a drive condition transmission unit that transmits position information related to a position of at least one drive target member among the plurality of drive target members to the camera body via a second transmission path different from the first transmission path over predetermined second cycles different from the predetermined first cycles.

9. An exchangeable lens according to claim 8, wherein:
after a change occurs in the initialization status of at least one drive target member among the plurality of drive target members, the drive condition transmission unit starts transmitting the drive condition of the drive target member, the initialization status of which has changed.

10. An exchangeable lens, comprising:
a mount unit at which a camera body is detachably engaged;
a drive target member, a condition of which changes as a drive force is applied thereto;
an initialization unit that executes initialization processing for the drive target member;
an initialization status transmission unit that transmits an initialization status indicating a status of the initialization processing executed for the drive target member to the camera body via a first transmission path over predetermined first transmission cycles; and
a drive condition transmission unit that transmits position information related to a position of the drive target member, to the camera body via a second transmission path different from the first transmission path over predetermined second cycles different from the predetermined first cycles.

11. An exchangeable lends according to claim 10, wherein:
the initialization status unit transmits the initialization status and the drive condition transmission unit transmits the position of the drive target member to the camera body concurrently.

12. A camera body, comprising:
a mount unit at which an exchangeable lens is detachably mounted, with the exchangeable lens being equipped with a plurality of drive target members, drive conditions of which change as a drive force is applied thereto;
an initialization status reception unit that receives initialization statuses, each indicating a status of specific initialization processing executed at the exchangeable lens for one of the drive target members, from the exchangeable lens via a first transmission path over first cycles; and
a drive condition reception unit that receives a drive condition of at least one drive target member among the plurality of drive target members from the exchangeable lens via a second transmission path different from the first transmission path over second cycles different from the first cycles.

13. A camera body according to claim 12, wherein:
after detecting a change in at least the initialization status of the one drive target member, the drive condition reception unit starts receiving the drive condition of the drive target member the initialization status of which has changed.

14. A camera body according to claim 13, wherein:
after the initialization statuses of all the drive target members for which the initialization processing is executed at the exchangeable lens change, the drive condition reception unit starts receiving at least the drive condition of the one drive target member.

15. A camera body according to claim 14, further comprising:
a control unit that enables specific control processing to be executed for each of the plurality of drive target members, wherein:
the control unit does not allow the control processing to be executed for any drive target member, execution of the initialization processing for which is indicated to be incomplete in the initialization status data.

16. A camera body according to claim 15, wherein:
one of the drive target members is an aperture; and
the control unit enables aperture control processing to be executed for the aperture as the control processing.

17. An exchangeable lens, comprising:
a mount unit at which a camera body is detachably engaged;
a plurality of drive target members, conditions of which change as a drive force is applied thereto;
an initialization unit that executes initialization processing for each of the plurality of drive target members;
an initialization status transmission unit that transmits initialization statuses, each indicating a status of the initialization processing executed for one of the drive target members, to the camera body via a first transmission path in response to a request output from the camera body over first cycles; and
a drive condition transmission unit that transmits a drive condition of at least one drive target member among the plurality of drive target members to the camera body via a second transmission path different from the first transmission path in response to a request output from the camera body over second cycles different from the first cycles, wherein:
after a change occurs at least in the initialization status of the one drive target member, the drive condition transmission unit starts transmitting the drive condition of the drive target member, the initialization status of which has changed.

18. An exchangeable lens comprising:
a mount unit at which a camera body is detachably engaged;
a plurality of drive target members, conditions of which change as a drive force is applied thereto;
an initialization unit that executes initialization processing for the drive target member; and
an initialization status transmission unit that transmits, using a single transmission path, an initialization status indicating a status of the initialization processing executed for each of the drive target members individually to the camera body.

19. An information transmission method for an exchangeable lens detachably engaged to a camera body at a mount, comprising:
an initialization step for executing initialization processing for a drive target member, a condition of which changes as a drive force is applied thereto;
an initialization status transmission step for transmitting an initialization status indicating a status of the initialization processing executed for the drive target member to the camera body via a first transmission path over predetermined first transmission cycles; and
a drive condition transmission step for transmitting position information related to a position of the drive target member, to the camera body via a second transmission path different from the first transmission path over predetermined second cycles different from the predetermined first cycles.

20. An information transmission method for an exchangeable lens detachably engaged to a camera body at a mount, comprising:
an initialization step for executing initialization processing for a plurality of drive target members, conditions of which change as a drive force is applied thereto; and
an initialization status transmission step for transmitting, using a single transmission path, an initialization status indicating a status of the initialization processing executed for each of the drive target members individually to the camera body.

* * * * *